(12) United States Patent
Nakamura et al.

(10) Patent No.: US 8,139,877 B2
(45) Date of Patent: Mar. 20, 2012

(54) IMAGE PROCESSING APPARATUS, IMAGE PROCESSING METHOD, AND COMPUTER-READABLE RECORDING MEDIUM INCLUDING SHOT GENERATION

(75) Inventors: Takeshi Nakamura, Saitama (JP); Yoshiaki Moriyama, Saitama (JP)

(73) Assignee: Pioneer Corporation, Tokyo (JP)

( * ) Notice: Subject to any disclaimer, the term of this patent is extended or adjusted under 35 U.S.C. 154(b) by 755 days.

(21) Appl. No.: 12/282,083

(22) PCT Filed: Mar. 6, 2007

(86) PCT No.: PCT/JP2007/054343
§ 371 (c)(1),
(2), (4) Date: Sep. 8, 2008

(87) PCT Pub. No.: WO2007/102511
PCT Pub. Date: Sep. 13, 2007

(65) Prior Publication Data
US 2009/0086034 A1 Apr. 2, 2009

(30) Foreign Application Priority Data
Mar. 9, 2006 (JP) .................................. 2006-064609

(51) Int. Cl.
*G06K 9/36* (2006.01)
*H04N 5/228* (2006.01)
*G06K 9/46* (2006.01)

(52) U.S. Cl. .................................... 382/236; 348/208.4
(58) Field of Classification Search .................. 382/164, 382/173, 232, 233, 236; 348/208.4, 699, 348/702; 375/240.01, 240.12, 240.15, 240.17, 375/240.29, E7.105
See application file for complete search history.

(56) References Cited

U.S. PATENT DOCUMENTS

| | | | | |
|---|---|---|---|---|
| 5,661,524 A * | 8/1997 | Murdock et al. | .......... | 375/240.15 |
| 5,926,225 A | 7/1999 | Fukuhara et al. | | |
| 6,049,362 A * | 4/2000 | Butter et al. | .................. | 348/699 |
| 6,198,772 B1 * | 3/2001 | Boice et al. | ............. | 375/240.17 |
| 6,252,905 B1 * | 6/2001 | Pokrinchak et al. | ...... | 375/240.14 |
| 7,006,571 B1 * | 2/2006 | Nakaya | .................... | 375/240.16 |
| 7,113,543 B2 * | 9/2006 | Cheung et al. | ........... | 375/240.12 |
| 7,602,851 B2 * | 10/2009 | Lee et al. | .................. | 375/240.25 |
| 2005/0237433 A1 * | 10/2005 | Van Dijk et al. | .............. | 348/702 |
| 2006/0002612 A1 | 1/2006 | Vigouroux et al. | | |
| 2008/0095451 A1 | 4/2008 | Nakamura | | |
| 2009/0086034 A1 * | 4/2009 | Nakamura et al. | .......... | 348/208.4 |

FOREIGN PATENT DOCUMENTS

| | | |
|---|---|---|
| EP | 1 359 767 B1 | 11/2003 |
| JP | 7-193748 A | 7/1995 |
| JP | 8-186789 A | 7/1996 |
| JP | 9-187015 A | 7/1997 |
| JP | 9-294277 A | 11/1997 |

(Continued)

*Primary Examiner* — Amir Alavi
(74) *Attorney, Agent, or Firm* — Foley & Lardner LLP

(57) ABSTRACT

An image processing apparatus includes a shot splitting unit that splits a moving image into a plurality of shots each including a plurality of sequential frames; a shot detecting unit that detects, among the shots, a second shot similar to a first shot that is to be encoded; a first shot-generating unit that generates a third shot by correcting a time length of the second shot; a second shot-generating unit that generates a fourth shot by performing motion compensation using at least one of the first shot and the third shot; and an encoding unit that encodes a difference between the first shot and the fourth shot.

18 Claims, 37 Drawing Sheets

FOREIGN PATENT DOCUMENTS

| | | |
|---|---|---|
| JP | 10-257436 A | 9/1998 |
| JP | 2001-054106 A | 2/2001 |
| JP | 2002-185969 A | 6/2002 |
| JP | 2002-271798 A | 9/2002 |
| JP | 2003-333602 A | 11/2003 |
| JP | 2006-020330 A | 1/2006 |
| WO | WO 2006-028156 A1 | 3/2006 |

* cited by examiner

FIG.6

| | REFERENCE-SIMILAR-SHOT GENERATING INFORMATION |
|---|---|
| METHOD 1 | <INFORMATION CONCERNING REFERENCE SIMILAR SHOT><br>  ・START TIME SR<br>  ・TIME DURATION DR<br><INFORMATION CONCERNING ORIGINAL SIMILAR SHOT><br>  ・SHOT ID |
| METHOD 2 | <INFORMATION CONCERNING REFERENCE SIMILAR SHOT><br>  ・START TIME SR<br>  ・TIME DURATION DR<br><INFORMATION CONCERNING ORIGINAL SIMILAR SHOT><br>  ・SHOT ID<br>  ・START TIME SO<br>  ・TIME DURATION DO |
| METHOD 3 | Loop{<br>  <INFORMATION CONCERNING REFERENCE SIMILAR SHOT><br>    ・START TIME SRn<br>    ・TIME DURATION DRn<br>  <INFORMATION CONCERNING ORIGINAL SIMILAR SHOT><br>    ・SHOT ID<br>    ・START TIME SOn<br>    ・TIME DURATION DOn<br>} |
| METHOD 4 | Loop{<br>  <INFORMATION CONCERNING REFERENCE SIMILAR SHOT><br>    ・START TIME SRn<br>    ・TIME DURATION DRn<br>  Loop{<br>    <INFORMATION CONCERNING ORIGINAL SIMILAR SHOT><br>      ・SHOT ID<br>      ・START TIME SOn<br>      ・TIME DURATION DOn<br>    <WEIGHTING INFORMATION><br>      ・WEIGHTED COEFFICIENT<br>  }<br>} |
| METHOD 5 | Loop{<br>  ・REFERENCE-SIMILAR-SHOT GENERATING METHOD ID<br>    ⋮<br>} |

FIG.20
⟨GLOBAL MOTION COMPENSATION PREDICTION⟩
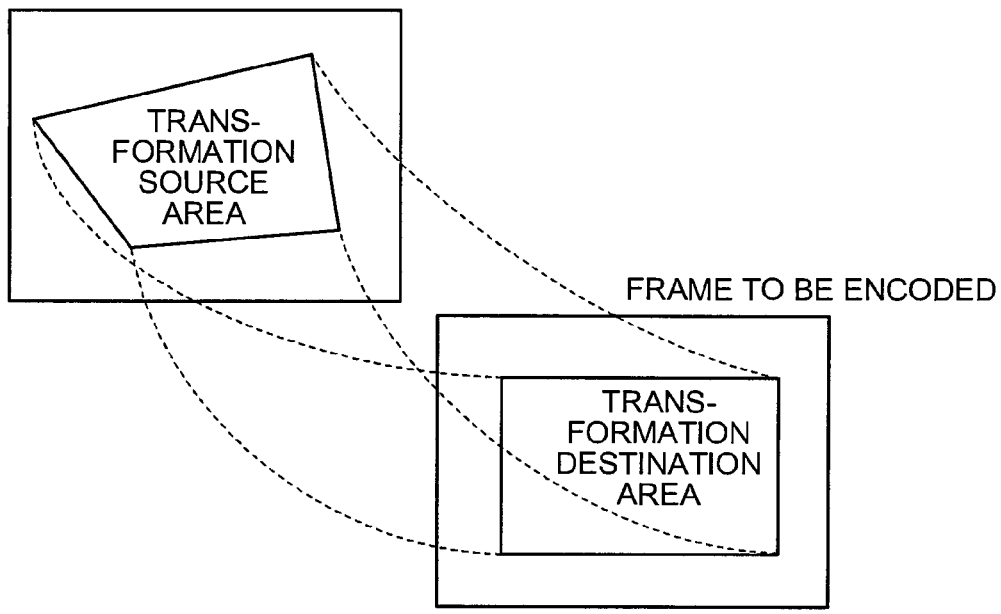
FIG.21
⟨MOTION COMPENSATION PREDICTION BY BLOCK⟩
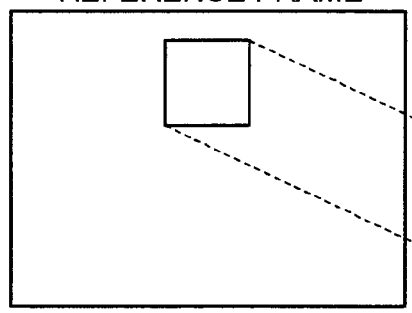
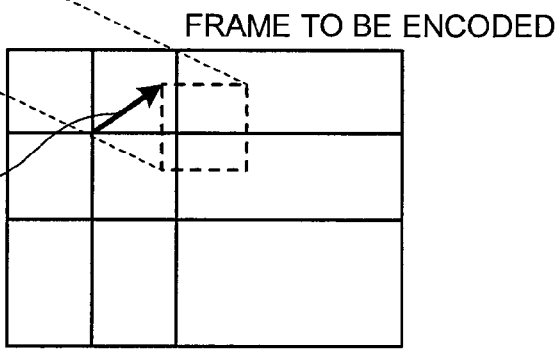

IMAGE PROCESSING APPARATUS, IMAGE PROCESSING METHOD, AND COMPUTER-READABLE RECORDING MEDIUM INCLUDING SHOT GENERATION

This application is a 371 of PCT/JP2007/054343 filed on Mar. 06, 2007.

TECHNICAL FIELD

The present invention relates to an image processing device, an image processing method, and an image processing program that encode or decode a moving image. However, the application of the present invention is not limited to the image processing device, the image processing method, and the image processing program above.

BACKGROUND ART

For various purposes of enhancing encoding efficiency in the encoding of a moving image, diversifying methods for accessing a moving image, facilitating the browsing of a moving image, and facilitating the conversion of a file format, inventions according to conventional techniques for structuring a moving image (specifically, rearranging the order of frames, hierarchizing a moving image per shot, and the like) are disclosed in Patent Documents 1 to 5 below.

In a conventional technique disclosed in Patent Document 1, a file generating unit creates editing information representing a rearrangement order for moving image data per frame. Furthermore, an image compressing unit compresses and encodes unedited moving image data based on a difference between frames and then, an output unit transmits the encoded data together with a file of the editing information.

Moreover, in a conventional technique disclosed in Patent Document 2, encoded prediction image data stored in an image-data-stream memory unit is read, to be thus separated into hierarchies by a hierarchy separating unit, according to a hierarchy of a data structure. Next, an image property-extracting unit extracts physical properties, i.e., properties that have generality and reflect content, from the separated hierarchy. Thereafter, an attribute vector-generating unit generates an attribute vector that characterizes each image according to the physical properties. Subsequently, a splitting/integrating unit calculates a distance between the attribute vectors, and then, splits/integrates the attribute vector, so as to automatically structure a picture having a deep hierarchal structure, and an attribute-vector managing unit stores and manages the attribute vector.

Alternatively, a conventional technique disclosed in Patent Document 3 is directed to an automatic hierarchy-structuring method, in which a moving image is encoded, the encoded moving image is split into shots, and then, a scene is extracted by integrating the shots using a similarity of each of the split shots. Moreover, the conventional technique disclosed in Patent Document 3 is also directed to a moving-image browsing method, in which the contents of all of the moving images are grasped using the hierarchy structured data and a desired scene or shot is readily detected.

Furthermore, in a conventional technique disclosed in Patent Document 4, a switching unit sequentially switches video signals on plural channels, picked up by plural cameras, a rearranging unit rearranges the video signals in a GOP unit per channel, an MPEG compressing unit compresses the video signals to be recorded in a recording unit, and further, an MPEG expanding unit expands the video signals per channel, thus compressing a data size so as to store and reproduce the picture data in the input order of each of the channels in total at a predetermined position of plural displaying memories such that a display control unit displays picture data on multiple screens, whereby an image output unit displays the multiple screens on one screen of a monitor.

Moreover, in a conventional technique disclosed in Patent Document 5, a size converting unit converts a reproduced moving-image signal A2 obtained by decoding, by an MPEG-2 decoder, a bit stream A1 in an MPEG-2 format which is a first moving-image encoding-data format and side information A3 into a format suitable for an MPEG-4 format which is a second moving image encoding data format. Then, a bit stream A6 in an MPEG-4 format is obtained by encoding, by an MPEG-4 encoder, a converted reproduced image-signal A4 using motion vector information included in converted side information A5. At the same time, an indexing unit performs indexing using a motion vector included in the side information A5, and structured data A7 is obtained.

Patent Document 1: Japanese Patent Application Laid-open No. H8-186789

Patent Document 2: Japanese Patent Application Laid-open No. H9-294277

Patent Document 3: Japanese Patent Application Laid-open No. H10-257436

Patent Document 4: Japanese Patent Application Laid-open No. 2001-054106

Patent Document 5: Japanese Patent Application Laid-open No. 2002-185969

DISCLOSURE OF INVENTION

Problem to be Solved by the Invention

Meanwhile, various prediction systems are conventionally proposed for the purpose of enhancing encoding efficiency in the encoding of a moving image. For example, encoding efficiency is enhanced by adopting a forward prediction frame (P frame) or a bidirectional prediction frame (B frame) in MPEG-1, adopting a field prediction in MPEG-2, adopting sprite encoding or GMC (global motion compensation) prediction in MPEG-4 part_2, and adopting plural reference frames in ITU-TH, 264/MPEG-4 part_10 (advanced video coding (AVC)).

A picture to be encoded normally includes numerous shots (plural sequential frames) similar to each other, as listed below:
 a bust shot of a news caster in a news program;
 a pitching/batting scene in a baseball game, a serving scene in a tennis game, a downhill/aerial scene of a ski jump, and the like;
 repetition of a highlight scene in a sports program;
 repetition of the same shot before and after a commercial message in a variety program;
 a close-up shot of each person in the case of alternating repetitive close-up shots in a dialogue scene between the two persons;
 an opening scene, an ending scene, or a reviewing scene of the last episode throughout all stories of a serialized drama, and the like; and
 repetition of the same commercial message.

Without mention of the repetition of the same shot, shots at the same angle by a fixed camera often result in similar shots. These similar shots can be expected to be reduced more in encoding volume as a whole by encoding a difference between the shots by regarding one shot as a reference frame of the other shot than by independently encoding the similar shots.

However, in the conventional MPEG, the structure of the entire target picture, for example, the repetition of the similar shots is not utilized for encoding (in other words, the redundancy of information amount between the similar shots is not utilized), but the shots are normally encoded in a time series order, thereby raising a problem of low encoding efficiency.

Means for Solving Problem

To solve the above problems and achieve an object, an image processing device according to an embodiment of the invention includes: a shot splitting unit that splits a moving image into a plurality of shots each including a plurality of sequential frames; a shot detecting unit that detects, among the shots split by the shot splitting unit, a second shot similar to a first shot that is to be encoded; a first shot-generating unit that generates a third shot by correcting a time length of the second shot detected by the shot detecting unit; a second shot-generating unit that generates a fourth shot by performing motion compensation using at least one of the first shot and the third shot; and an encoding unit that encodes a difference between the first shot and the fourth shot generated by the second shot-generating unit.

Furthermore, an image processing device according to an embodiment of the invention includes: a shot splitting unit that splits a moving image into a plurality of shots each including a plurality of sequential frames; a shot detecting unit that detects, among the shots split by the shot splitting unit, a second shot similar to a first shot that is to be encoded; a first shot-generating unit that generates a third shot by correcting a time length of the second shot detected by the shot detecting unit; a second shot-generating unit that generates a fourth shot using difference information concerning frames in the third shot and the first shot; a third shot-generating unit that generates a fifth shot by performing motion compensation using the fourth shot; and an encoding unit that encodes a difference between the first shot and the fifth shot generated by the third shot-generating unit.

Furthermore, an image processing device according to an embodiment of the invention includes: a shot splitting unit that splits a moving image into a plurality of shots each including a plurality of sequential frames; a shot detecting unit that detects, among the shots split by the shot splitting unit, a second shot similar to a first shot that is to be encoded; a first shot-generating unit that generates a third shot by correcting a time length of the second shot detected by the shot detecting unit; a second shot-generating unit that generates a fourth shot by performing motion compensation on the first shot using motion information of the second shot; and an encoding unit that encodes a difference between the first shot and the fourth shot generated by the second shot-generating unit.

Furthermore, an image processing device according to an embodiment of the invention includes: a shot decoding unit that decodes, among encoded data of a moving image, encoded data of a first shot that includes a plurality of sequential frames; a first shot-generating unit that generates, using a method specified by shot generating information included in the encoded data of the moving image, a third shot by correcting a time length of a second shot that is in the moving image and similar to the first shot; a second shot-generating unit that generates a fourth shot by performing motion compensation using at least one of the encoded data decoded by the shot decoding unit and the first shot; and a shot adding unit that adds the encoded data decoded by the shot decoding unit to the fourth shot generated by the second shot-generating unit.

Furthermore, an image processing device according to an embodiment of the invention includes: a shot decoding unit that decodes, among encoded data of a moving image, encoded data of a first shot that includes a plurality of sequential frames; a first shot-generating unit that generates, using a method specified by shot generating information included in the encoded data of the moving image, a third shot by correcting a time length of a second shot that is in the moving image and similar to the first shot; a second shot-generating unit that generates a fourth shot using difference information concerning frames in the third shot and the first shot; a third shot-generating unit that generates a fifth shot by performing motion compensation on the fourth shot; and a shot adding unit that adds the encoded data decoded by the shot decoding unit to the fifth shot generated by the third shot-generating unit.

Furthermore, an image processing device according to an embodiment of the invention includes: a shot decoding unit that decodes, among encoded data of a moving image, encoded data of a first shot including a plurality of sequential frames; a first shot-generating unit that generates, using a method specified by shot generating information included in the encoded data of the moving image, a third shot by correcting a time length of a second shot that is in the moving image and similar to the first shot; a second shot-generating unit that generates a fourth shot by performing motion compensation on the first shot using motion information of the second shot; and a shot adding unit that adds the encoded data decoded by the shot decoding unit to the fourth shot generated by the second shot-generating unit.

Furthermore, an image processing method according to an embodiment of the invention includes: a shot splitting step of splitting a moving image into a plurality of shots each including a plurality of sequential frames; a shot detecting step of detecting, among the shots split at the shot splitting step, a second shot similar to a first shot that is to be encoded; a first shot-generating step of generating a third shot by correcting a time length of the second shot detected at the shot detecting step; a second shot-generating step of generating a fourth shot by performing motion compensation using at least one of the first shot and the third shot; and an encoding step of encoding a difference between the first shot and the fourth shot generated at the second shot-generating step.

Furthermore, an image processing method according to an embodiment of the invention includes: a shot splitting step of splitting a moving image into a plurality of shots each including a plurality of sequential frames; a shot detecting step of detecting, among the shots split at the shot splitting step, a second shot similar to a first shot that is to be encoded; a first shot-generating step of generating a third shot by correcting a time length of the second shot detected at the shot detecting step; a second shot-generating step of generating a fourth shot using difference information concerning frames in the third shot and the first shot; a third shot-generating step of generating a fifth shot by performing motion compensation using the fourth shot; and an encoding step of encoding a difference between the first shot and the fifth shot generated at the third shot-generating step.

Furthermore, an image processing method according to an embodiment of the invention includes: a shot splitting step of splitting a moving image into a plurality of shots each including a plurality of sequential frames; a shot detecting step of detecting, among the shots split at the shot splitting step, a second shot similar to a first shot that is to be encoded; a first shot-generating step of generating a third shot by correcting a time length of the second shot detected at the shot detecting step; a second shot-generating step of generating a fourth shot by performing motion compensation on the first shot using motion information of the second shot; and an encoding step of encoding a difference between the first shot and the fourth shot generated at the second shot-generating step.

Furthermore, an image processing method according to an embodiment of the invention includes: a shot decoding step of decoding, among encoded data of a moving image, encoded data of a first shot that includes a plurality of sequential frames; a first shot-generating step of generating, using a method specified by shot generating information included in the encoded data of the moving image, a third shot by correcting a time length of a second shot that is in the moving image and similar to the first shot; a second shot-generating step of generating a fourth shot by performing motion compensation using at least one of the encoded data decoded at the shot decoding step and the first shot; and a shot adding step of adding the encoded data decoded at the shot decoding step to the fourth shot generated at the second shot-generating step.

Furthermore, an image processing method according to an embodiment of the invention includes: a shot decoding step of decoding, among encoded data of a moving image, encoded data of a first shot that includes a plurality of sequential frames; a first shot-generating step of generating, using a method specified by shot generating information included in the encoded data of the moving image, a third shot by correcting a time length of a second shot that is in the moving image and similar to the first shot; a second shot-generating step of generating a fourth shot using difference information concerning frames in the third shot and the first shot; a third shot-generating step of generating a fifth shot by performing motion compensation on the fourth shot; and a shot adding step of adding the encoded data decoded at the shot decoding step to the fifth shot generated at the third shot-generating step.

Furthermore, an image processing method according to an embodiment of the invention includes: a shot decoding step of decoding, among encoded data of a moving image, encoded data of a first shot including a plurality of sequential frames; a first shot-generating step of generating, using a method specified by shot generating information included in the encoded data of the moving image, a third shot by correcting a time length of a second shot that is in the moving image and similar to the first shot; a second shot-generating step of generating a fourth shot by performing motion compensation on the first shot using motion information of the second shot; and a shot adding step of adding the encoded data decoded at the shot decoding step to the fourth shot generated at the second shot-generating step.

Furthermore, an image processing program according to an embodiment of the invention causes a computer to execute the image processing method according to another embodiment of the invention.

BRIEF DESCRIPTION OF DRAWINGS

FIG. 6 is an explanatory diagram of an example of reference-similar-shot generating information;

FIG. 20 is an explanatory diagram of a concept of a global motion compensation prediction;

FIG. 21 is an explanatory diagram of a concept of motion compensation prediction by block;

Figure 29:
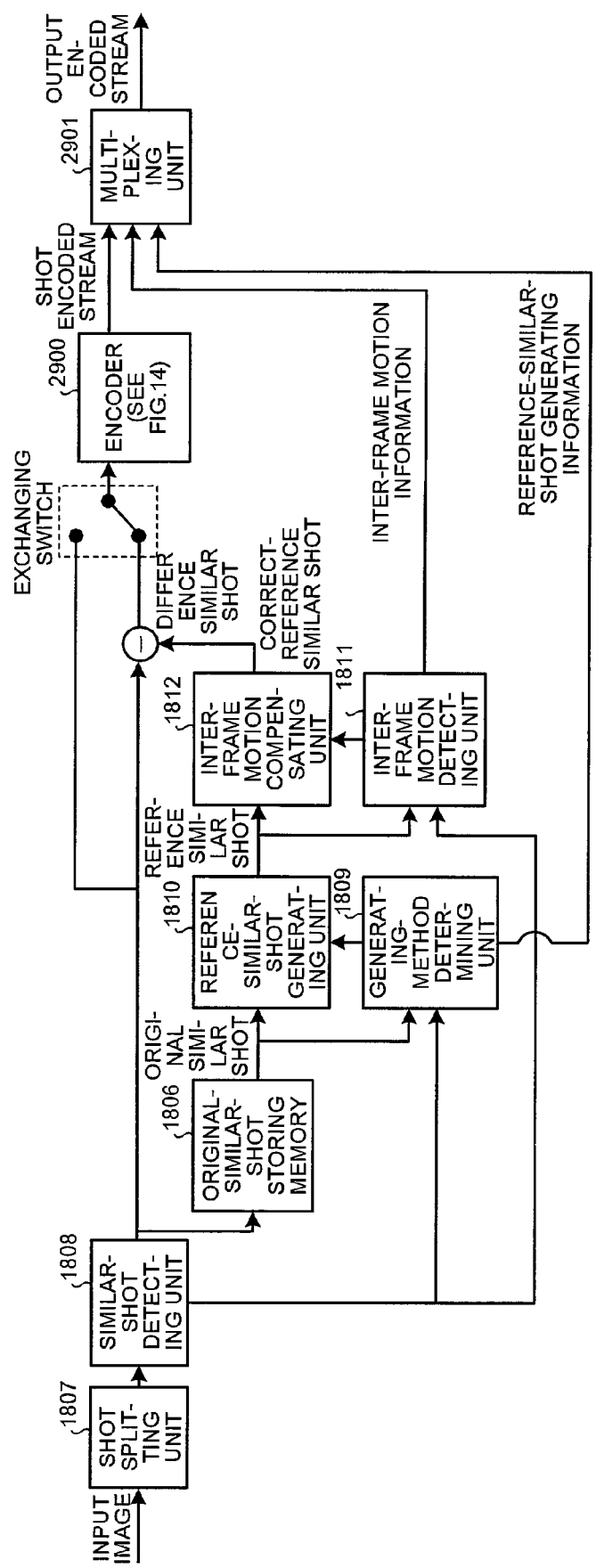
Figure 30:
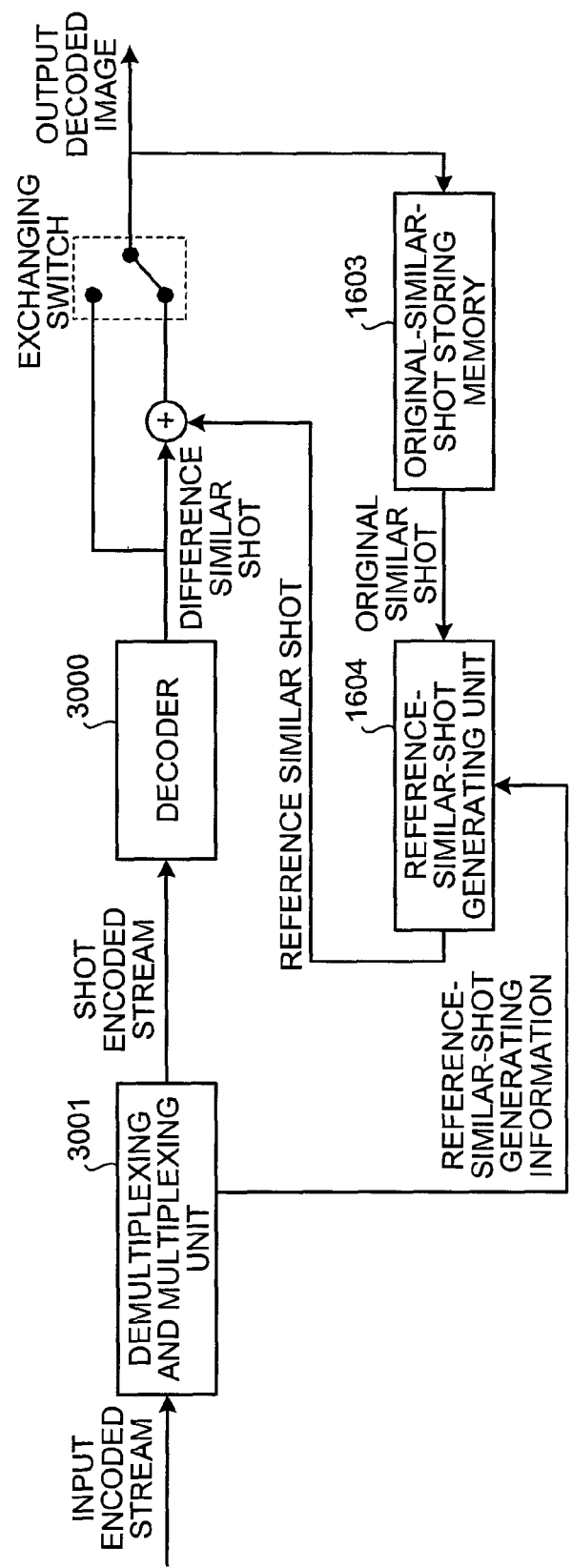
Figure 31:
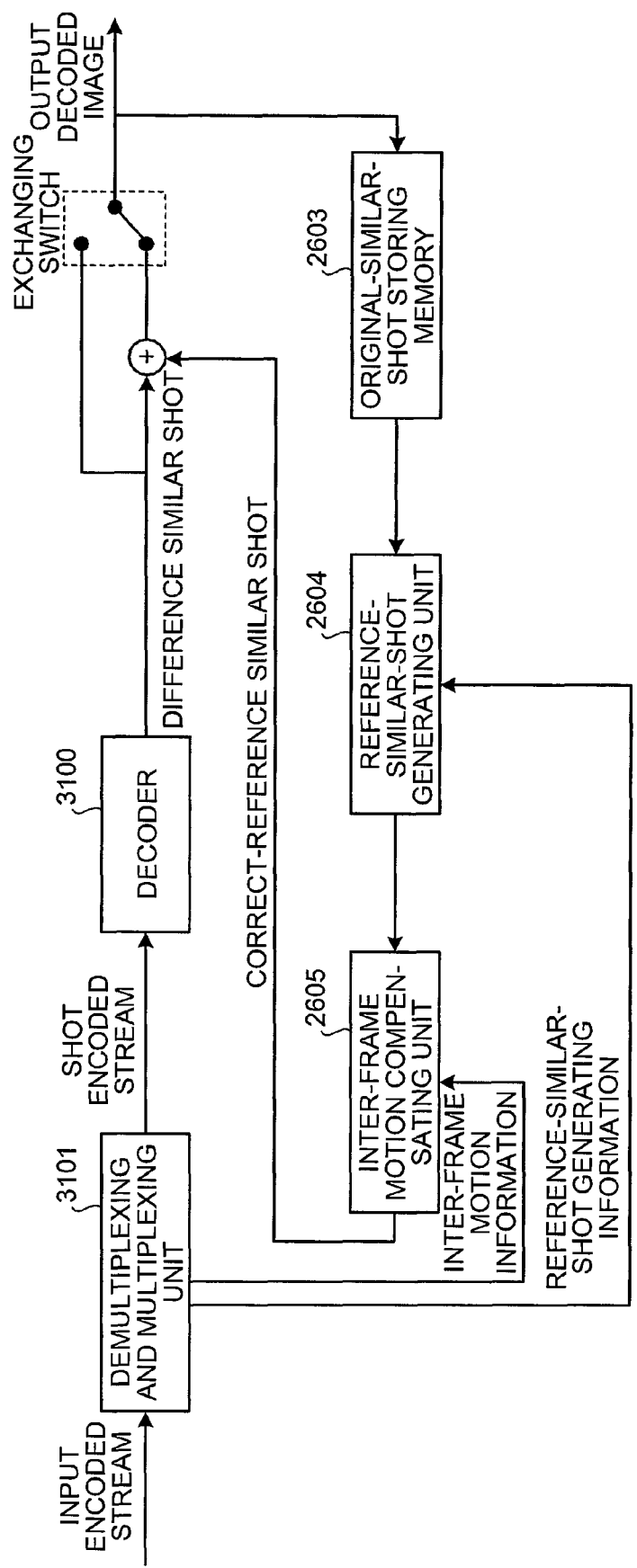
Figure 32:
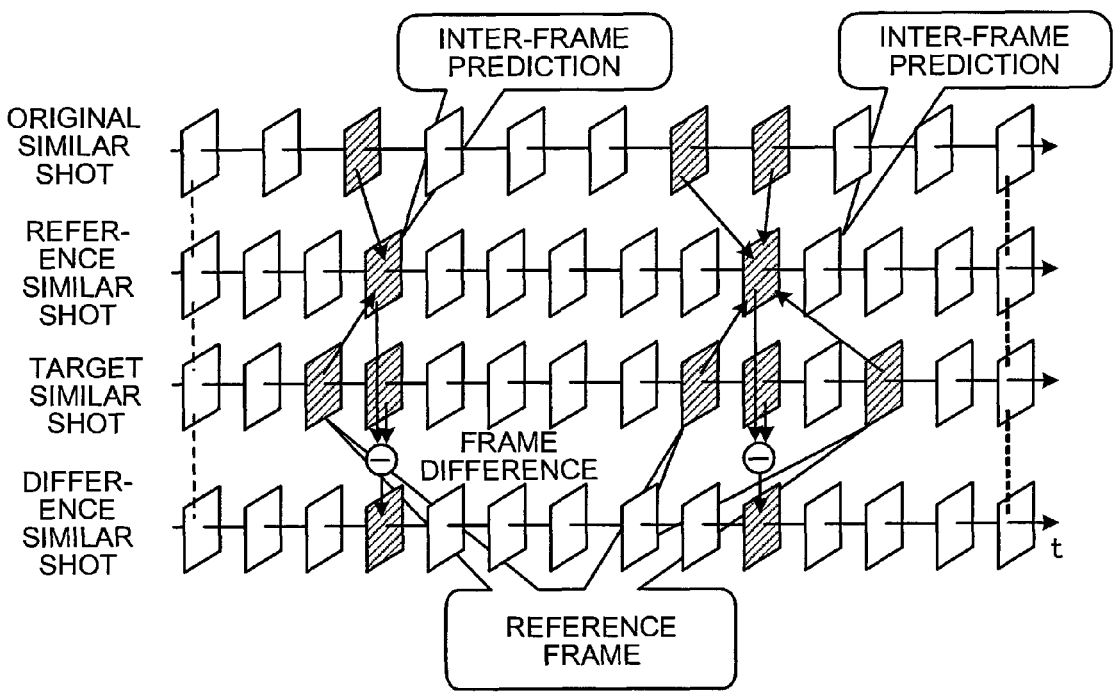
Figure 33:
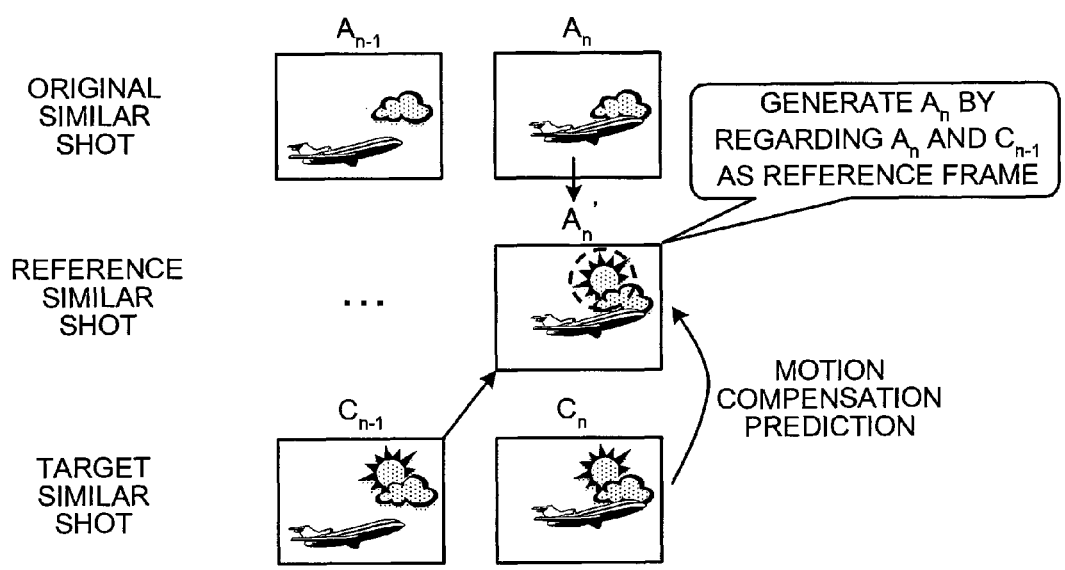
Figure 34:
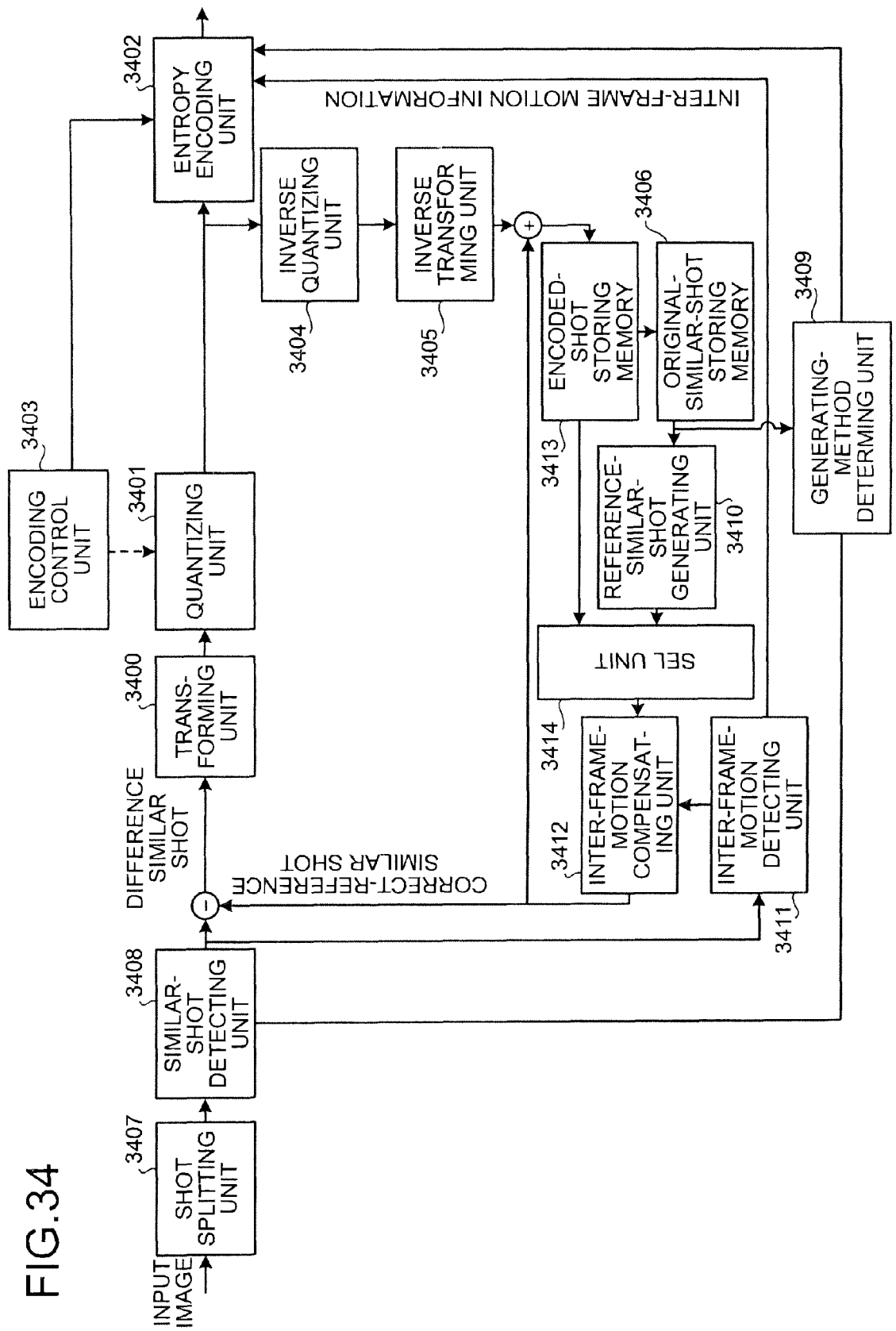
Figure 35:
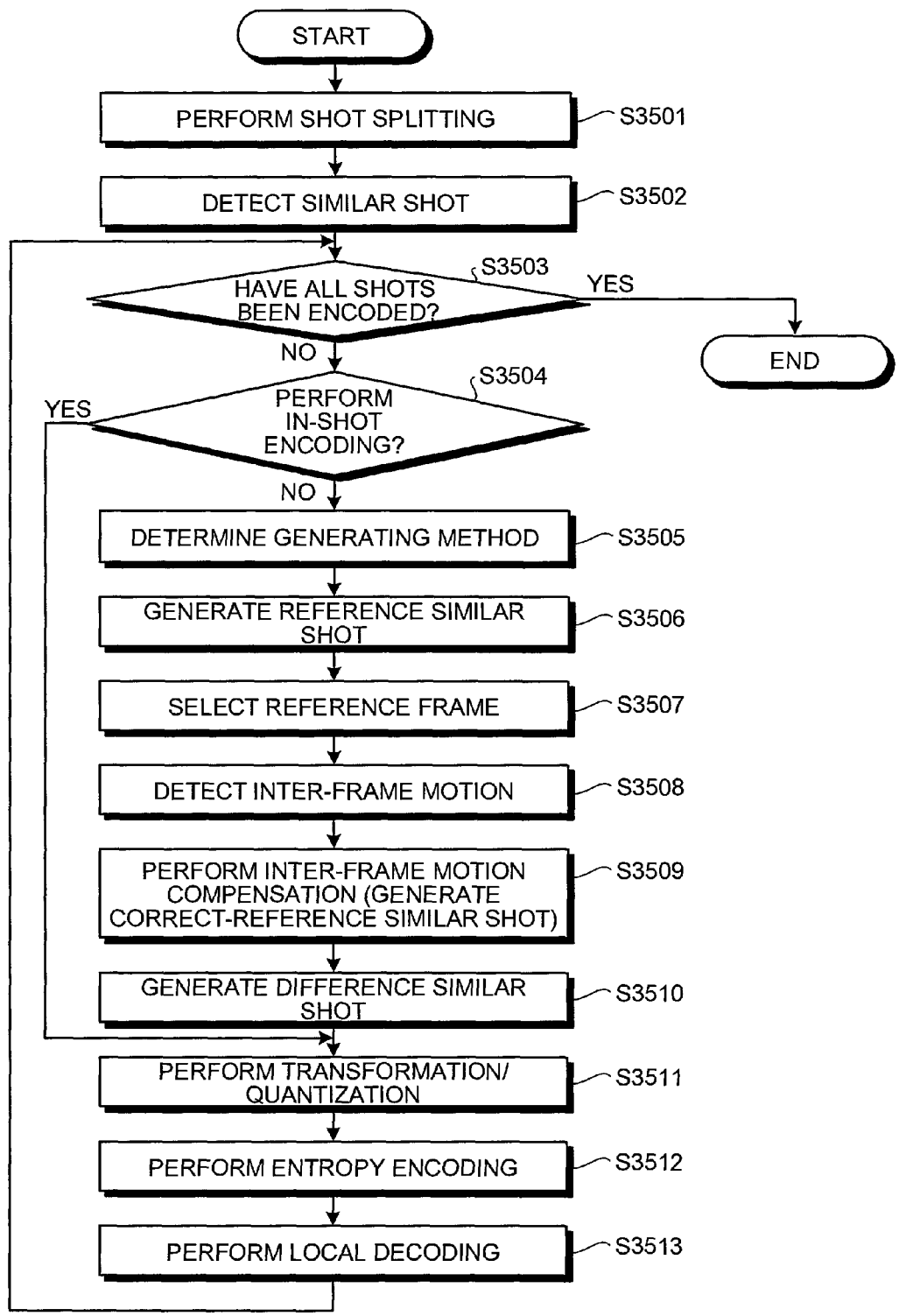
Figure 36:
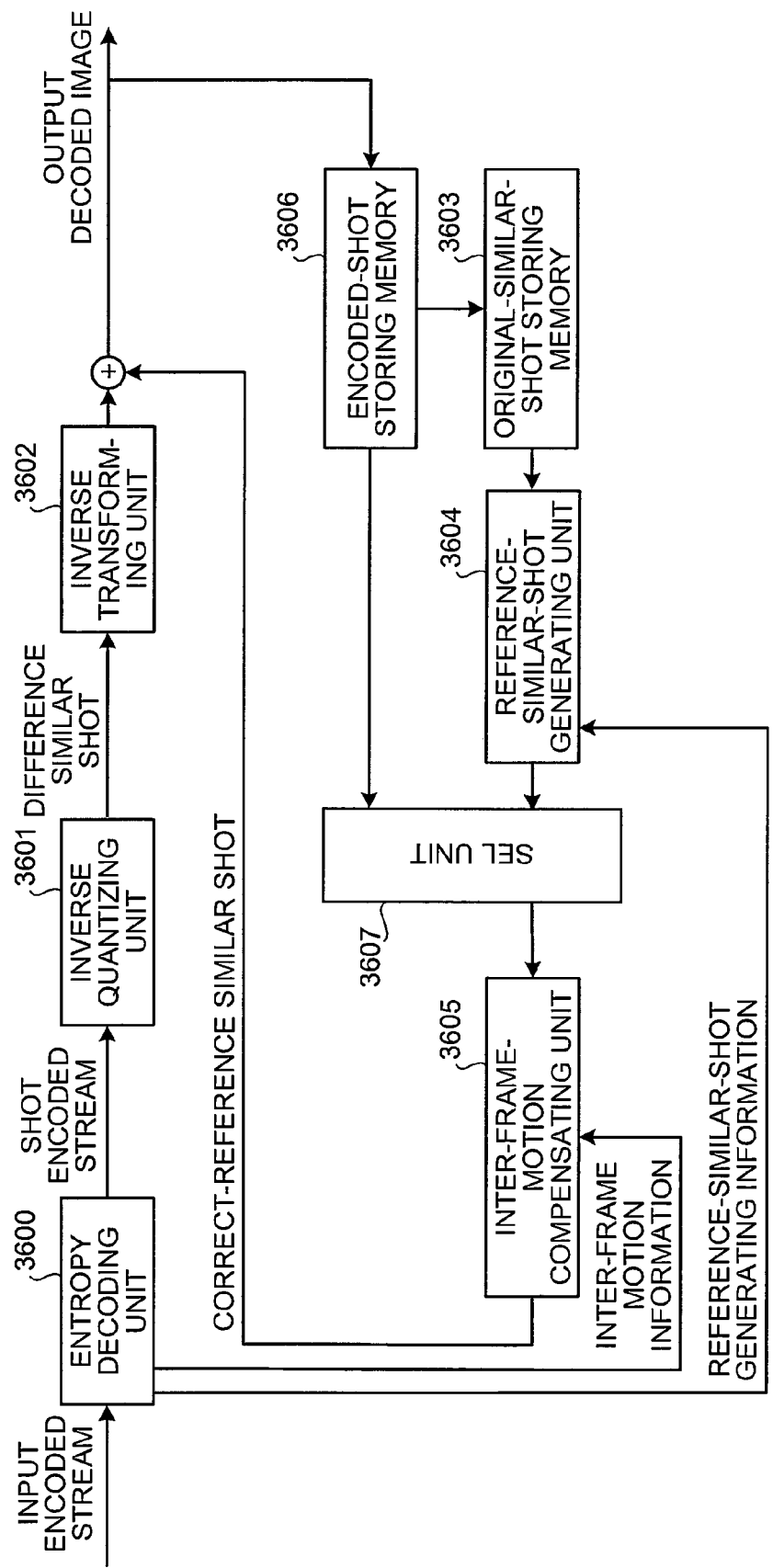
Figure 37:
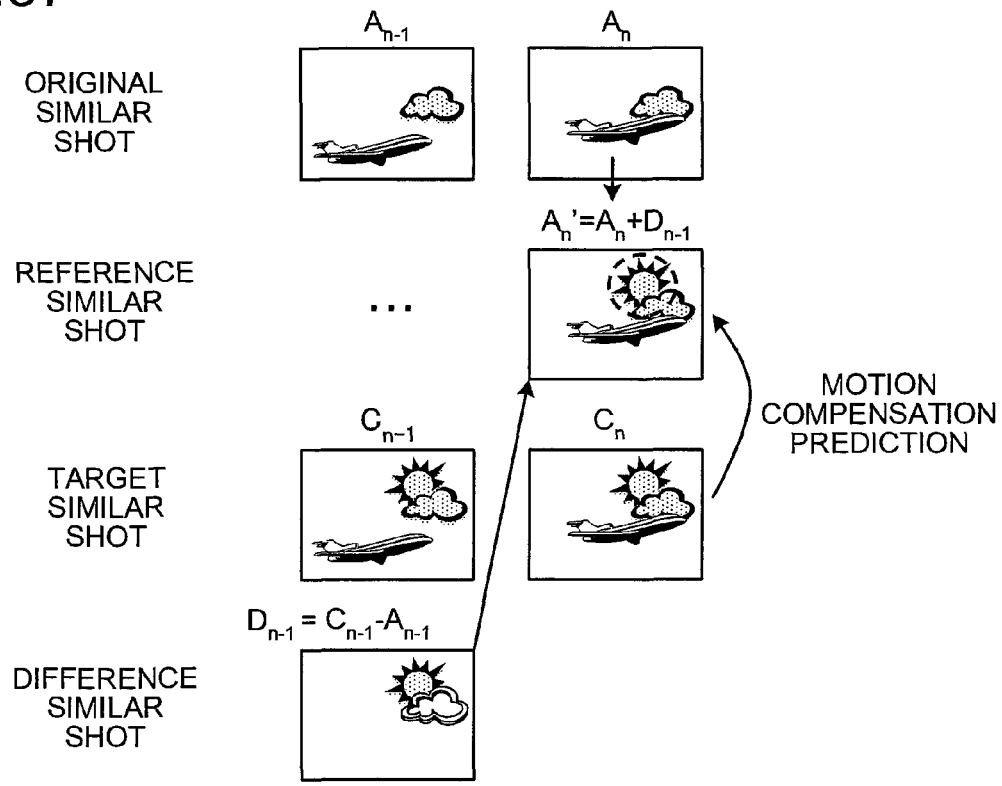
Figure 38:
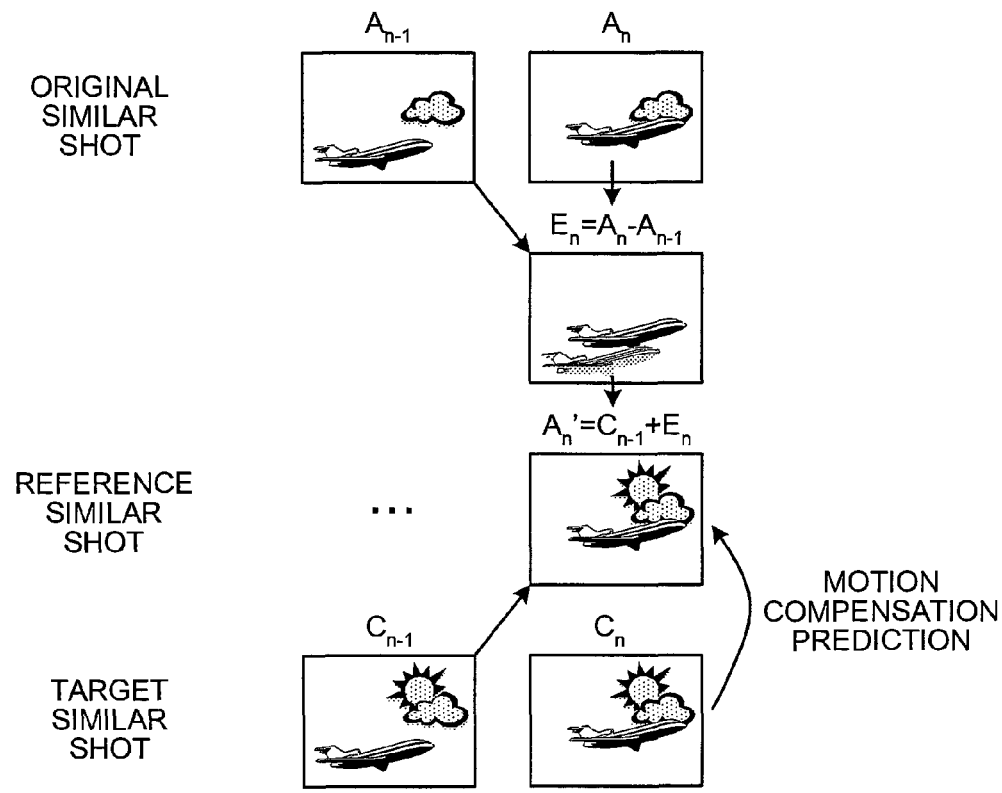
Figure 39:
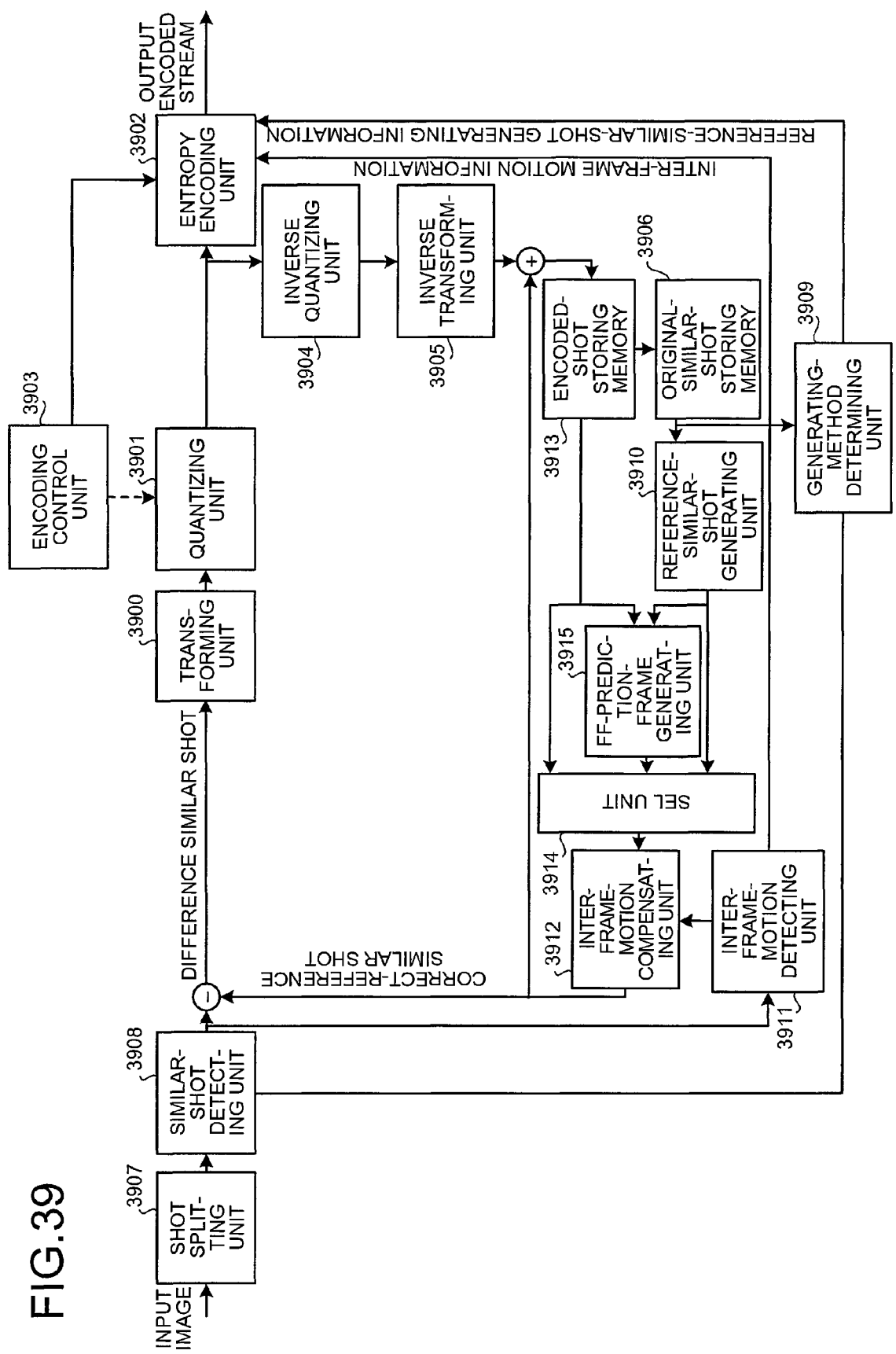
Figure 40:
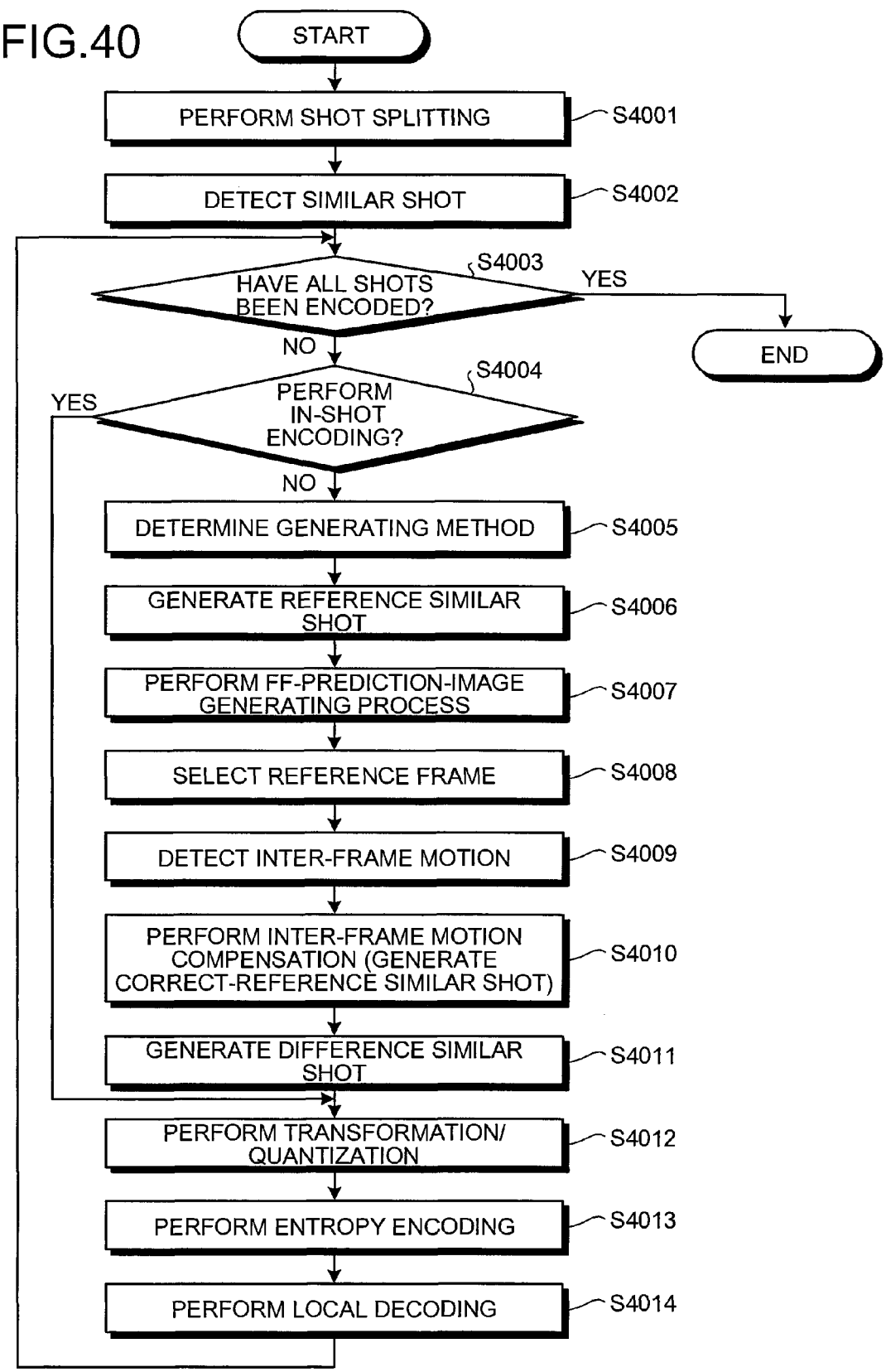
Figure 41:
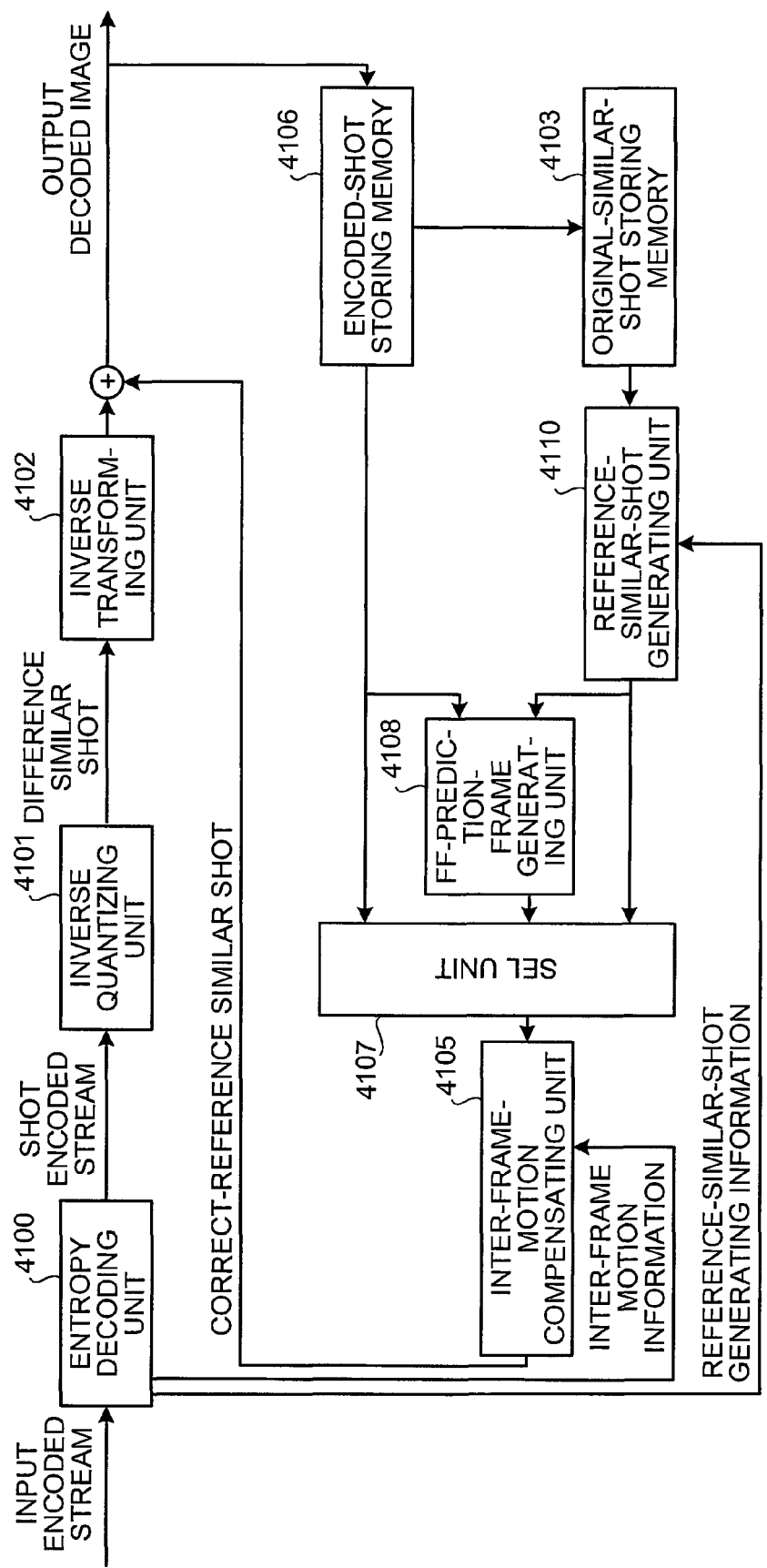
Figure 42:
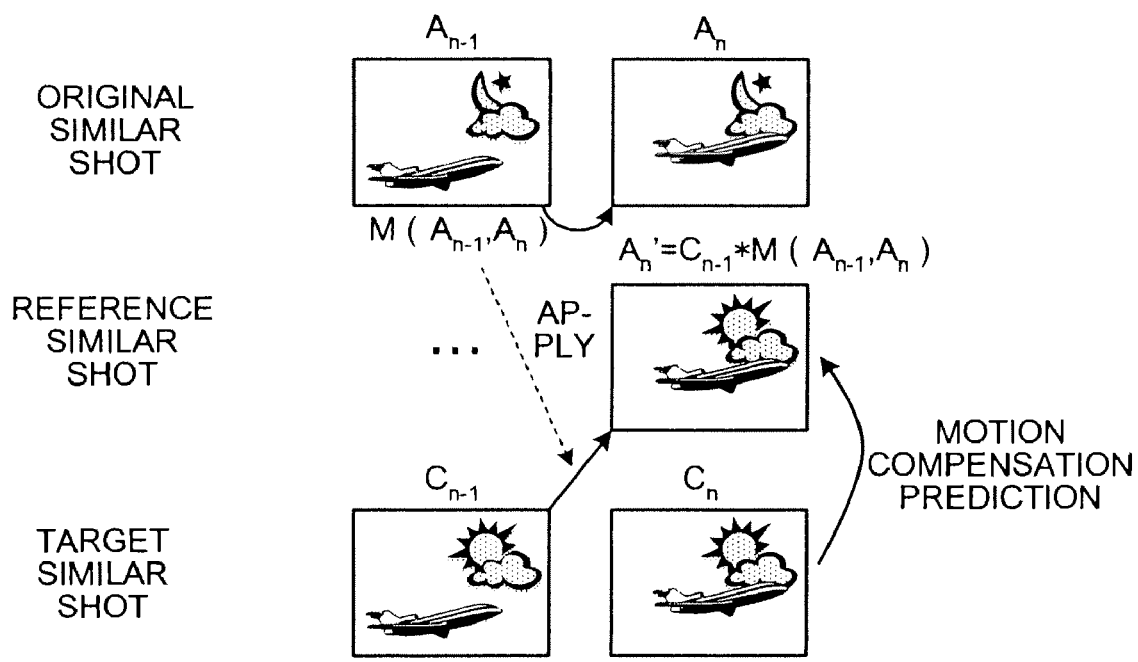
Figure 43:
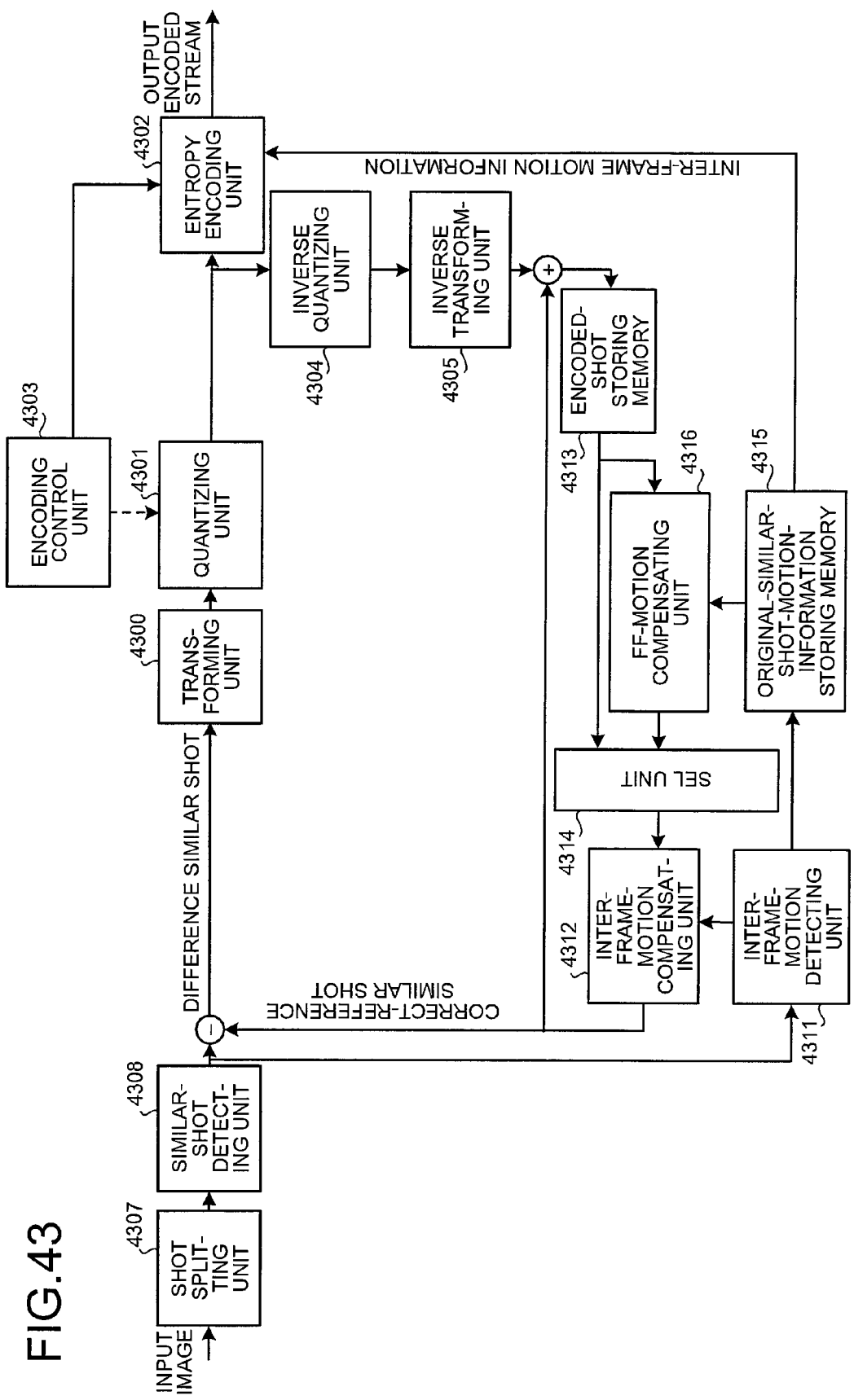
Figure 44:
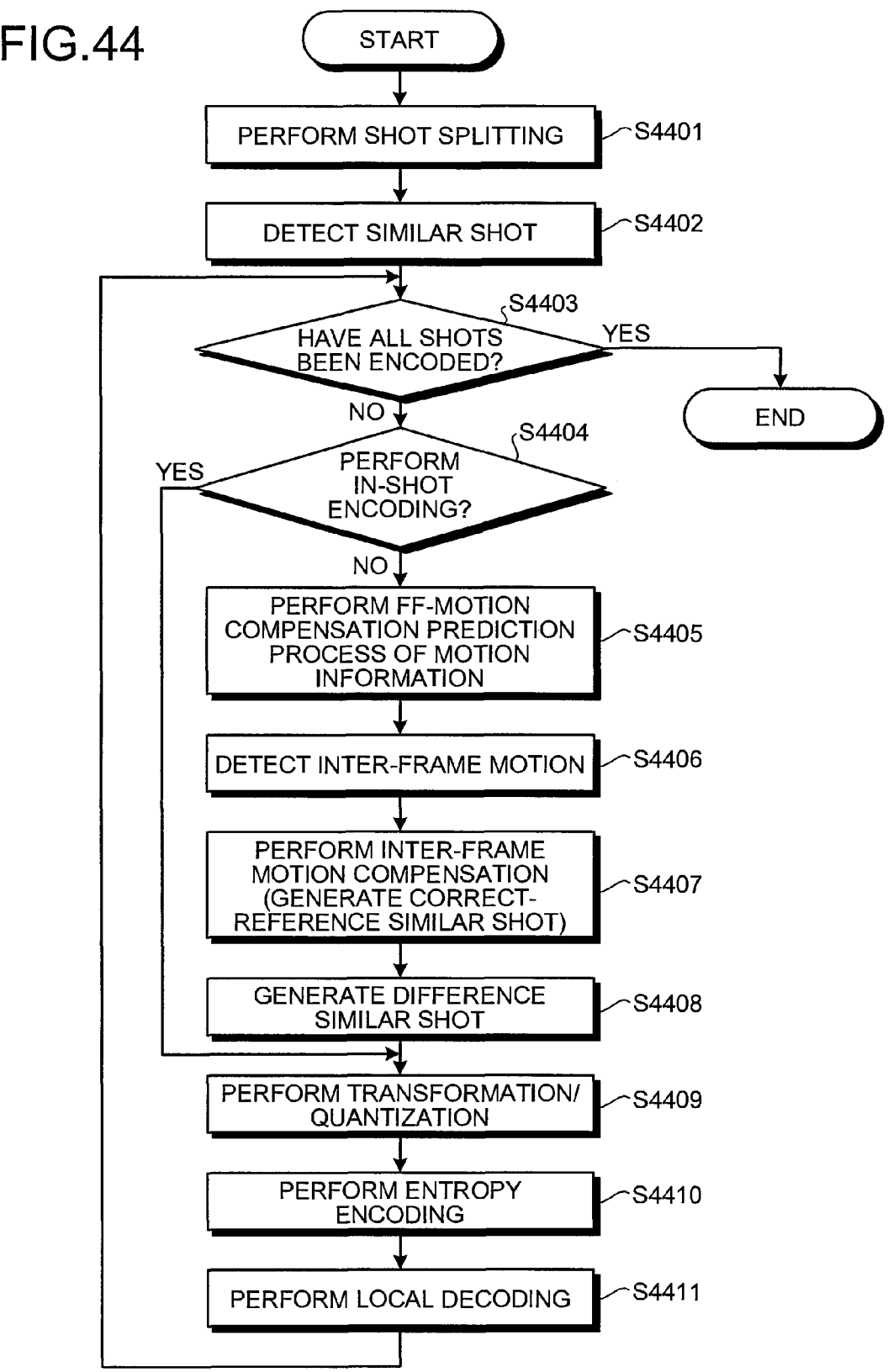
Figure 45:
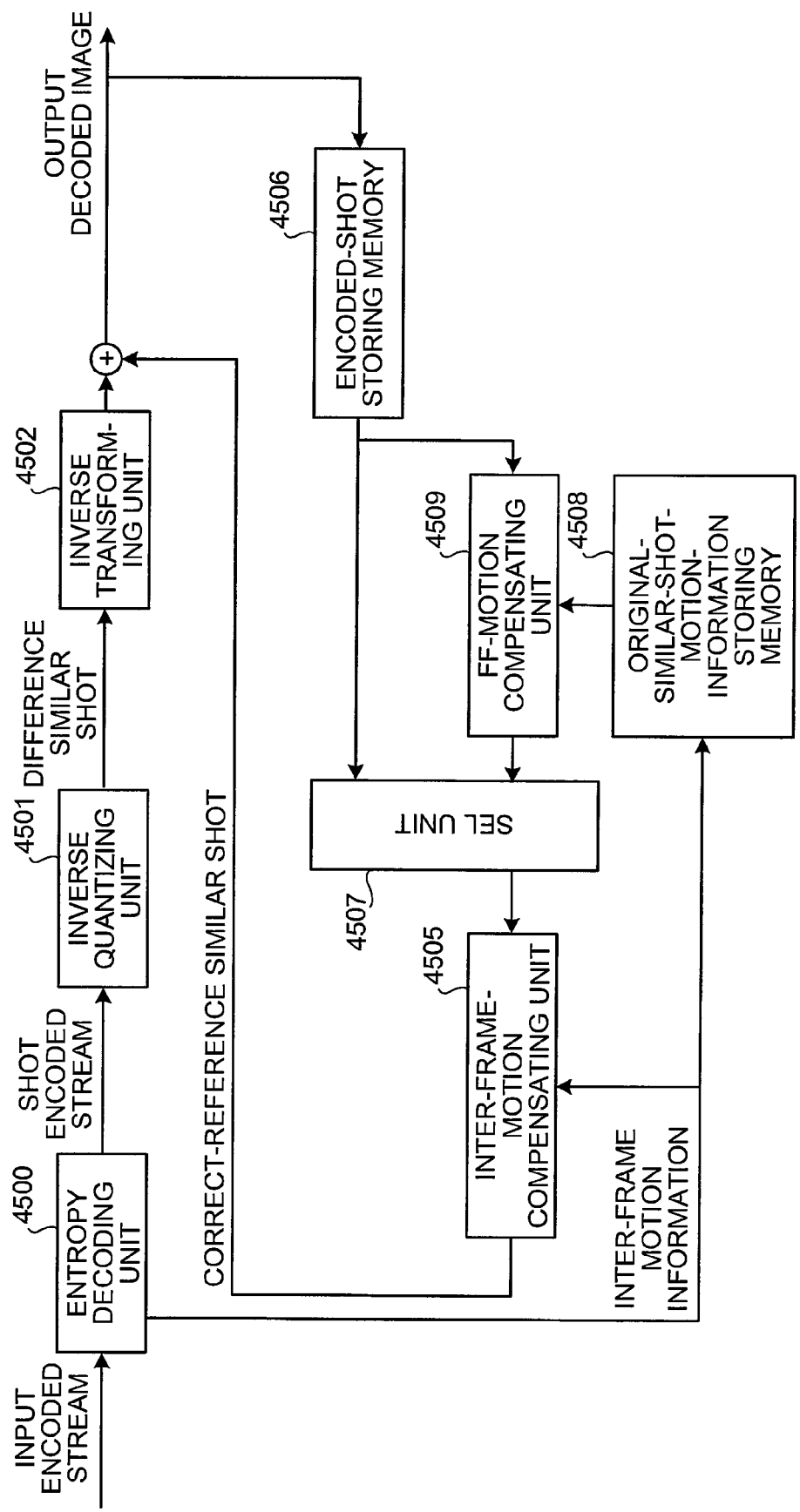

according to the example 1 of the present invention (when a conventional encoder is used as it is);

FIG. 29 is an explanatory diagram of another example of a configuration of the image processing device (encoder) according to the example 2 of the present invention (when the conventional encoder is used as it is);

FIG. 30 is an explanatory diagram of another example of a configuration of the image processing device (decoder) according to the example 1 of the present invention (when a conventional decoder is used as it is);

FIG. 31 is an explanatory diagram of another example of a configuration of the image processing device (decoder) according to the example 2 of the present invention (when the conventional decoder is used as it is);

FIG. 32 is an explanatory diagram of a method of inter-frame prediction using the target similar shot as a reference frame;

FIG. 33 is an explanatory diagram of a method of motion compensation prediction including the target similar shot;

FIG. 34 is an explanatory diagram of an example of a configuration of an image processing device (encoder) according to method 1 of a selective-inter-frame-motion compensation prediction of example 3 of the present invention;

FIG. 35 is a flowchart of an image encoding process of the image processing device (encoder) according to method 1 of the selective-inter-frame-motion compensation prediction of example 3 of the present invention;

FIG. 36 is an explanatory diagram of an example of a configuration of an image processing device (decoder) according to method 1 of the selective-inter-frame-motion compensation prediction of example 3 of the present invention;

FIG. 37 is a first explanatory diagram of a method of feedforward prediction using encoding residual;

FIG. 38 is a second explanatory diagram of a method of the feedforward prediction using the encoding residual;

FIG. 39 is an explanatory diagram of an example of a configuration of an image processing device (encoder) according to method 2 of a selective-inter-frame-motion compensation prediction of example 3 of the present invention;

FIG. 40 is a flowchart of the image encoding process of the image processing device (encoder) according to method 2 of the selective-inter-frame-motion compensation prediction of example 3 of the present invention;

FIG. 41 is an explanatory diagram of an example of a configuration of an image processing device (decoder) according to method 2 of the selective-inter-frame-motion compensation prediction of example 3 of the present invention;

FIG. 42 is an explanatory diagram of a method of the feedforward prediction using motion information of the original similar shot;

FIG. 43 is an explanatory diagram of an example of a configuration of an image processing device (encoder) according to method 3 of the selective-inter-frame-motion compensation prediction of example 3 of the present invention;

FIG. 44 is a flowchart of the image encoding process of the image processing device (encoder) according to method 3 of the selective-inter-frame-motion compensation prediction of example 3 of the present invention; and FIG. 45 is an explanatory diagram of an example of a configuration of an image processing device (decoder) according to method 3 of the selective-inter-frame-motion compensation prediction of example 3 of the present invention.

EXPLANATIONS OF LETTERS OR NUMERALS 1300, 1400, 1800, 1900, 3400, 3900, 4300 transforming unit
1301, 1401, 1801, 1901, 3401, 3901, 4301 quantizing unit
1302, 1402, 1802, 1902, 3402, 3902, 4302 entropy encoding unit
1303, 1403, 1803, 1903, 3403, 3903, 4303 encoding control unit
1304, 1404, 1601, 1804, 1904, 2601, 3404, 3601, 3904, 4101, 4304, 4501 inverse quantizing unit
1305, 1405, 1602, 1805, 1905, 2602, 3405, 3602, 3905, 4102, 4305, 4502 inverse transforming unit
1306, 1603, 1806, 2603, 3406, 3603, 3906, 4103 original-similar-shot storing memory
1307, 1807, 3407, 3907, 4307 shot splitting unit
1308, 1808, 3408, 3908, 4308 similar-shot detecting unit
1309, 1809, 3409, 3909 generating-method determining unit
1310, 1604, 1810, 2604, 3410, 3910, 4104 reference-similar-shot generating unit
1406, 1906 reference-frame storing memory
1600, 2600, 3600, 4100, 4500 entropy decoding unit
1811, 1907, 3411, 3911, 4311 inter-frame-motion detecting unit
1812, 1908, 2605, 3412, 3605, 3912, 4105, 4312, 4505 inter-frame-motion compensating unit
2800, 2900 encoder
2801, 2901 multiplexing unit
3000, 3100 decoder
3001, 3101 demultiplexing and multiplexing unit
3413, 3606, 3913, 4106, 4313, 4506 encoded-shot storing memory
3414, 3607, 3914, 4107, 4314, 4507 reference-frame selecting (SEL) unit
3915, 4108 FF-prediction-frame generating unit
4315, 4508 original-similar-shot-motion-information storing memory
4316, 4509 FF-motion compensating unit

BEST MODE(S) FOR CARRYING OUT THE INVENTION

Referring to the attached drawings, exemplary embodiments of the image processing device, the image processing method, and the image processing program according to the present invention will be explained in details below.
(Embodiment)

The present invention is, in a word, one in which an image to be encoded is split into plural sequential frames, i.e., shots, and, for each shot, a difference between each shot and a similar shot to the concerned shot is encoded (regarding a reference frame for each frame in a shot to be encoded as each corresponding frame in a shot similar to the concerned). Since frames forming similar shots are usually similar to each other, a value of a difference between frames is expected to converge to a neighborhood of zero. Therefore, reduction in encoding volume is expected compared with the conventional techniques in which a reference frame is simply determined based on the distance from a frame to be encoded.

Figure 1:
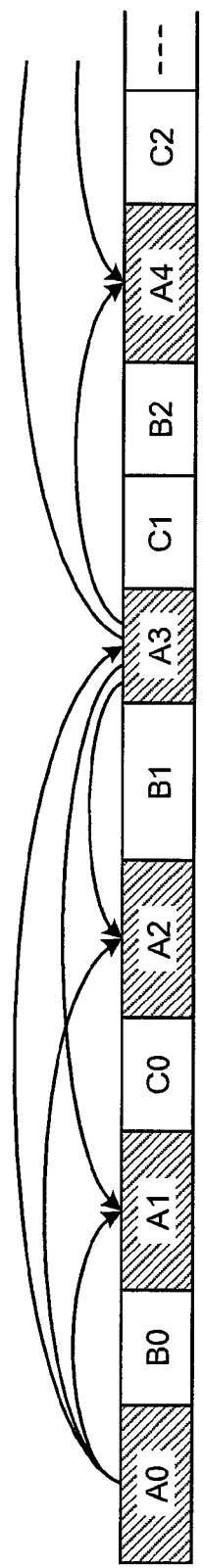
FIG. 1 is an explanatory diagram of reference relationship between shots split and sorted by the present invention.

FIG. 1 is an explanatory diagram of reference relationship between shots split and sorted by the present invention. In the illustrated example, shots in an image are sorted into three groups A, B, and C (similar shot groups) that are similar to one another. For example, in the group A, a shot "A3" refers to a shot "A0" (forward prediction), shots "A1" and "A2" each refer to the shots "A0" and "A3" (bidirectional prediction frame), to be encoded. Thus, a shot to be referred to may be plural, a past shot (temporally-previous shot), and a future shot (temporally-subsequent shot). As a result, the encoding and decoding order of shots is not always identical to the time-series order, i.e., the appearance order in the image.

A split point of the shot is exemplified by a change point of image property value in the picture or a change point of property value of a background sound. Among them, the change point of image property value may be exemplified by a switch point of a screen (i.e., a scene change or a cut point) or a change point of camera work (such as a scene change, panning, zooming, or a stop). Here, the present invention places no particular importance on where the split point is located or how the split point is specified (in other words, how the shot is constituted).

Although the present invention places no particular importance on how the similarity between the shots is calculated, for example, an attribute vector X is obtained for each shot, and then, a Euclidean distance between the attribute vectors is regarded as the similarity between the shots.

Figure 2:
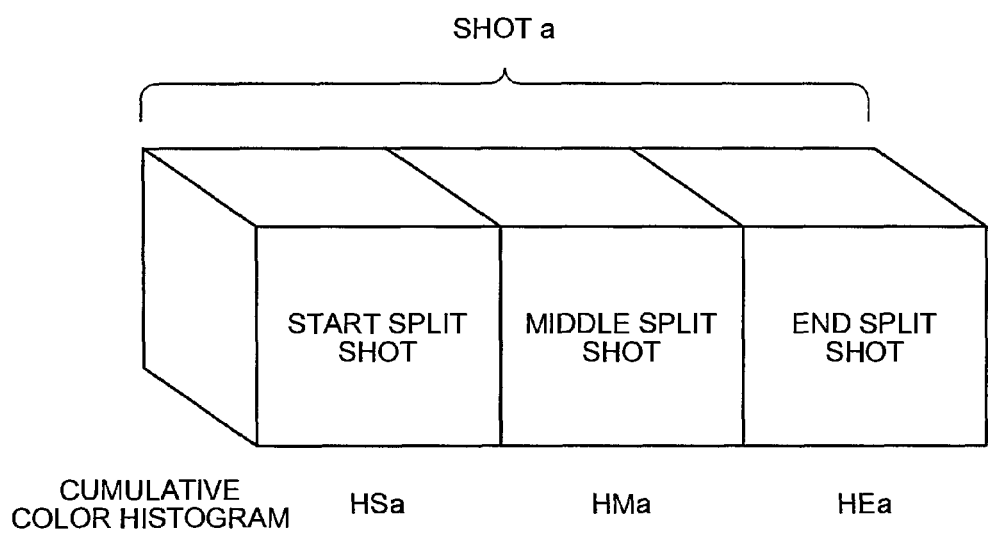
FIG. 2 is an explanatory diagram of a property value of each shot to be a base of an attribute vector.

For example, an attribute vector Xa of shot A is a multi-dimensional vector consisting of cumulative color histograms of partial shots obtained by splitting shot A into N shots. As shown in FIG. 2, when N is 3, $$Xa = [HSa, HMa, HEa],$$

where, HSa is a cumulative color histogram of a "start split shot" in FIG. 2;

HMa is a cumulative color histogram of a "middle split shot" in FIG. 2; and

HEa is a cumulative color histogram of an "end split shot" in FIG. 2.

Here, HSa, HMa, and HEa per se are multi-dimensional attribute vectors.

The "color histogram" is a count of appearance times in each plural region obtained by splitting a color space with respect to all pixels inside of the frame. For example, RGB (R/red, G/green, and B/blue), a CbCr component out of YCbCr (Y/luminance and CbCr/color difference), and a Hue component out of HSV (H/hue, S/saturation, and V/value) are utilized as the color space. Images different in size can be compared with each other by normalizing the obtained histogram using the number of pixels in the frame. The "cumulative color histogram" is obtained by cumulating the normalized histogram with respect to all of the frames in the shot.

Subsequently, a similarity $D_{a,b}$ between shot A and another shot B is calculated using the attribute vectors obtained as described above, according to, for example, the following equation. The smaller the value $D_{a,b}$ of the shots (i.e., a distance between the attribute vectors is smaller) is, the higher the similarity is. The greater the value $D_{a,b}$ of the shot (i.e., a distance between the attribute vectors is greater) is, the lower the similarity is. In the present invention, the shots having a value equal to or less than a predetermined threshold are grouped, and a difference between shots in the same group is encoded to achieve enhanced encoding efficiency.

$$D_{a,b} = \|X_a - X_b\|$$ [Equation 1]

Figure 3:
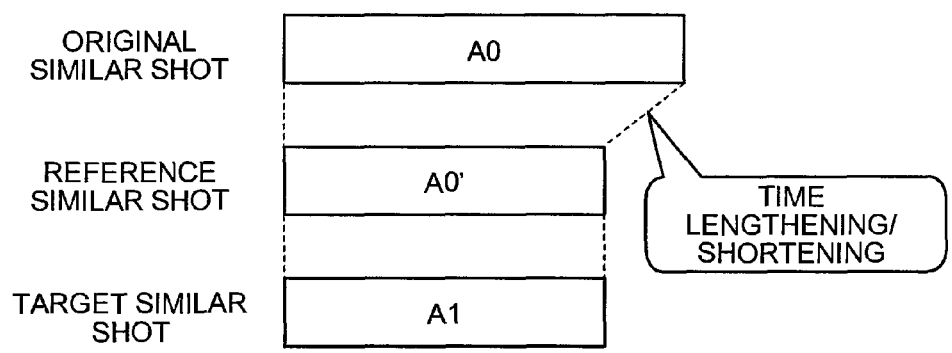
FIG. 3 is an explanatory diagram of a relationship among an "original similar shot", a "reference similar shot", and a "target similar shot"

Since time length of the shot to be encoded and that of the reference shot are not always identical, it is impossible to simply calculate the difference. Specifically, correction to lengthen or shorten the latter to match the time length thereof to that of the former is necessary. In the present invention, a shot before being subjected to the correction is called an "original similar shot", a shot that is generated by the above correction and subtracted from a shot to be encoded (hereinafter, a "target similar shot") is called a "reference similar shot". The relationship among the "original similar shot", the "reference similar shot", and the "target similar shot" is shown in FIG. 3.

Figure 4:
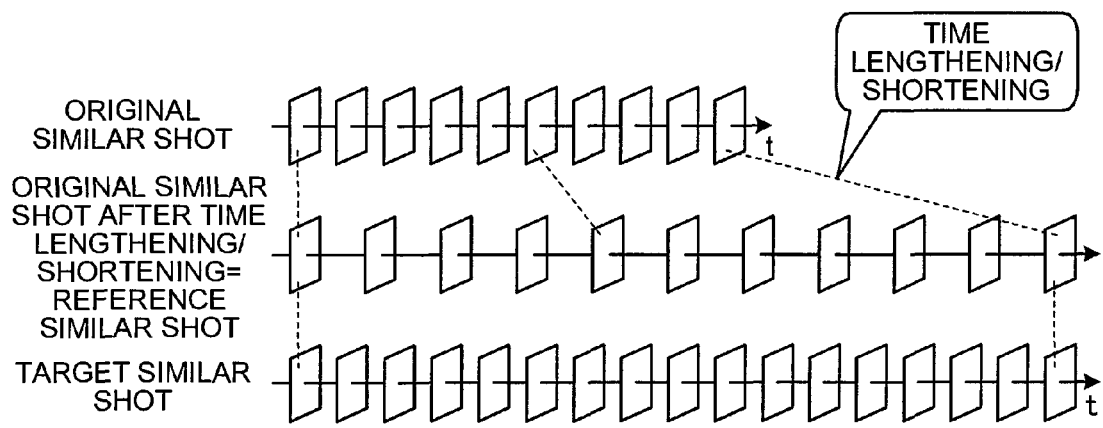
FIG. 4 is an explanatory diagram of a method of correcting time length of the original similar shot (when a frame position is not corrected)
Figure 5:
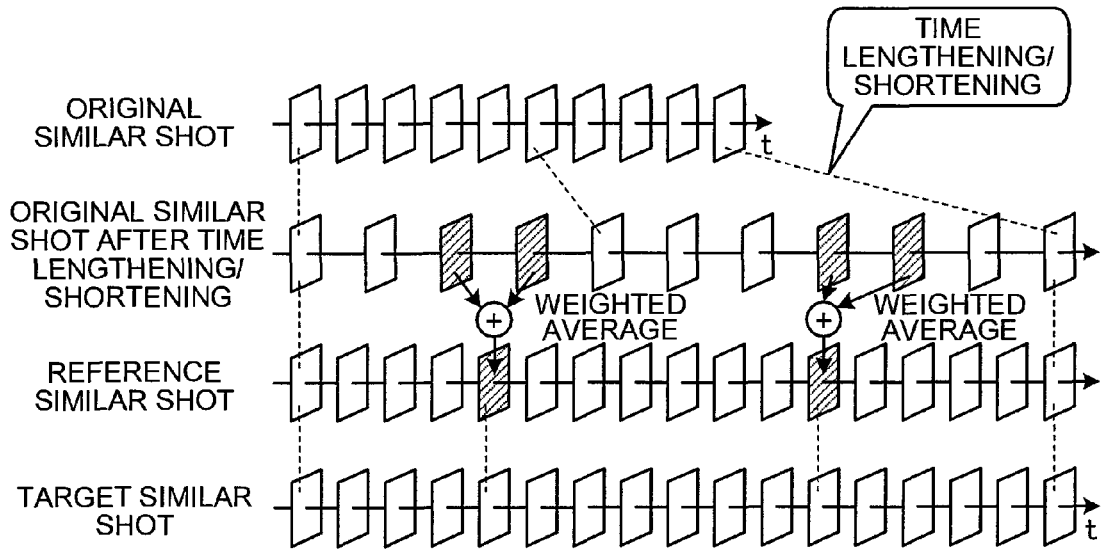
FIG. 5 is an explanatory diagram of a method of correcting time length of the original similar shot (when the frame position is corrected)

As a method of the above correction, the following two cases in which correction of frame position (frame interpolation or thinning) is included and not included are considered; however, the method is not limited to the following.
(Time-Length Correction of Original Similar Shot-Method 1) When Frame Position is not Corrected As shown in FIG. 4, it is a method of changing a frame interval of the original similar shot, i.e., changing only apparent shot time-length without correcting frames in the original similar shot. Though time lengthening and shortening by this method is simple, the frame positions of the reference similar shot and that of the target similar shot do not match as shown in FIG. 4, necessitating subsequent processing that considers this deviation.
(Time-Length Correction of Original Similar Shot-Method 2) When Frame Position is Corrected As shown in FIG. 5, it is a method of interpolating frames at the same position as the frame position of the target similar shot after lengthening and shortening the frame interval of the original similar shot in a similar manner as method 1. For example, in the original similar shot after being subjected to the time-length correction, two frames located in front and back of a target frame in the target similar shot are weighted-averaged according to the distance with respect to the target frame for interpolation at the same position as the target frame. Since this method includes correction of all frames in the original similar shot, this method is complicated. However, since the frame position is matched between the reference similar shot and the target similar shot, subsequent processing becomes simple a comparison of the frames located at the same position.

Although the original similar shot used for generating the reference similar shot may be any shot or any part of the shot as long as the shot is similar to the target similar shot, the following five methods are considered, for example. An example of reference-similar-shot generating information required for the decoding side when generating the reference similar shot by each method (therefore, required to be incorporated into an encoded stream) is shown in FIG. 6.
(Generation of Reference Similar Shot-Method 1) Entire Section of Single Original Similar Shot is Used As shown in FIG. 3, it is a method of generating the reference similar shot by lengthening or shortening the entire section of one original similar shot (FIG. 3 is an example of time-shortening). When this method is adopted, only an identifier to identify the original similar shot to be used (original similar shot ID) is required for the reference-similar-shot generating information. The lengthening/shortening rate of the original similar shot is uniquely defined based on time ratio between the original similar shot and the target similar shot.

Figure 7:
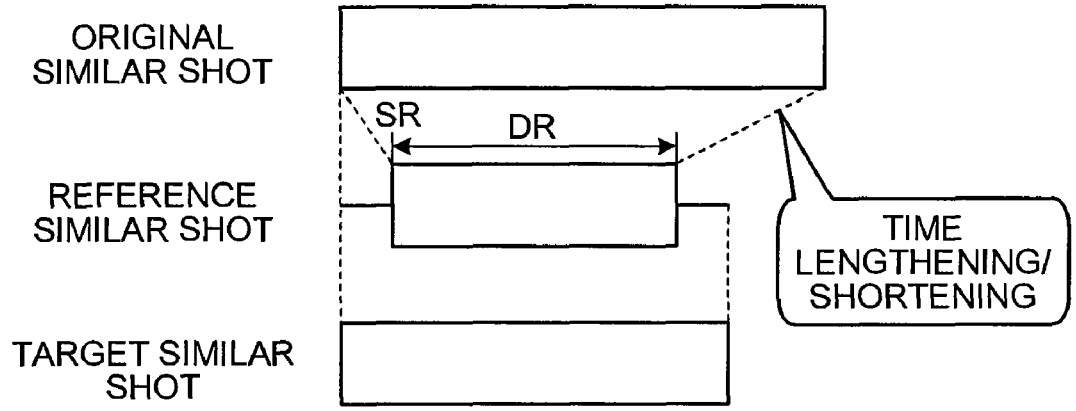
FIG. 7 is an explanatory diagram of a method of generating the reference similar shot (when an entire section of a single original similar shot is used)

The entire section of the target similar shot is not always prediction-encoded from the reference similar shot. Even between the similar shots, corresponding frames are not always similar to each other. Therefore, as shown in FIG. 7, the reference similar shot may be partially generated with respect to only a section of the target similar shot that well matches the original similar shot. In this case, frames in the section of the target similar shot that has no corresponding reference similar shot are encoded as they are (i.e., intraencoded without taking a difference with respect to another frame). It can be considered that there is no reference similar shot in the above section, but it can be also considered that there are reference similar shots having values all of zero.

In a case in which this method is adopted, required as the reference-similar-shot generating information are start time SR and duration DR specifying with respect to which section of the target similar shot (from where to where) the reference similar shot is to be generated, and the original similar shot ID used for generating the reference similar shot (see FIG. 6). In the above case shown in FIG. 3, the start time SR☐the beginning of the target similar shot, and the duration DR☐the duration of the target similar shot in FIG. 7, necessitating only the original similar shot ID, an exceptional case.

Figure 8:
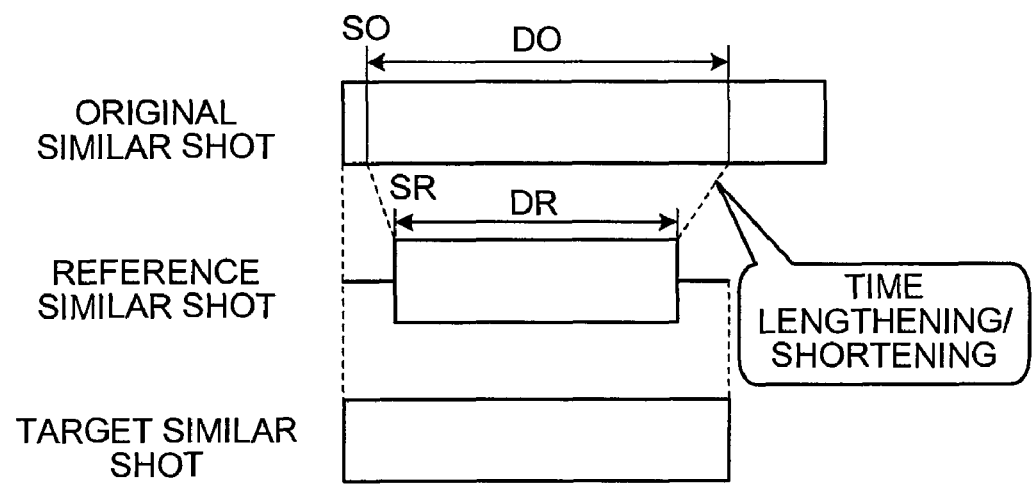
FIG. 8 is an explanatory diagram of a method of generating the reference similar shot (when a partial section of a single original similar shot is used)

(Generation of Reference Similar Shot-Method 2) Partial Section of Single Original Similar Shot is Used As shown in FIG. 8, it is a method of generating the reference similar shot by lengthening or shortening a partial section of one original similar shot (FIG. 8 is an example of time-shortening). In a case in which this method is adopted, required as the reference-similar-shot generating information are the start time SR and the duration DR specifying with respect to which section of the target similar shot (from where to where) the reference similar shot is to be generated, the original similar shot ID used for generating the reference similar shot, start time SO and duration DO specifying which section of the original similar shot is used for generating the reference similar shot (see FIG. 6).

Figure 9:
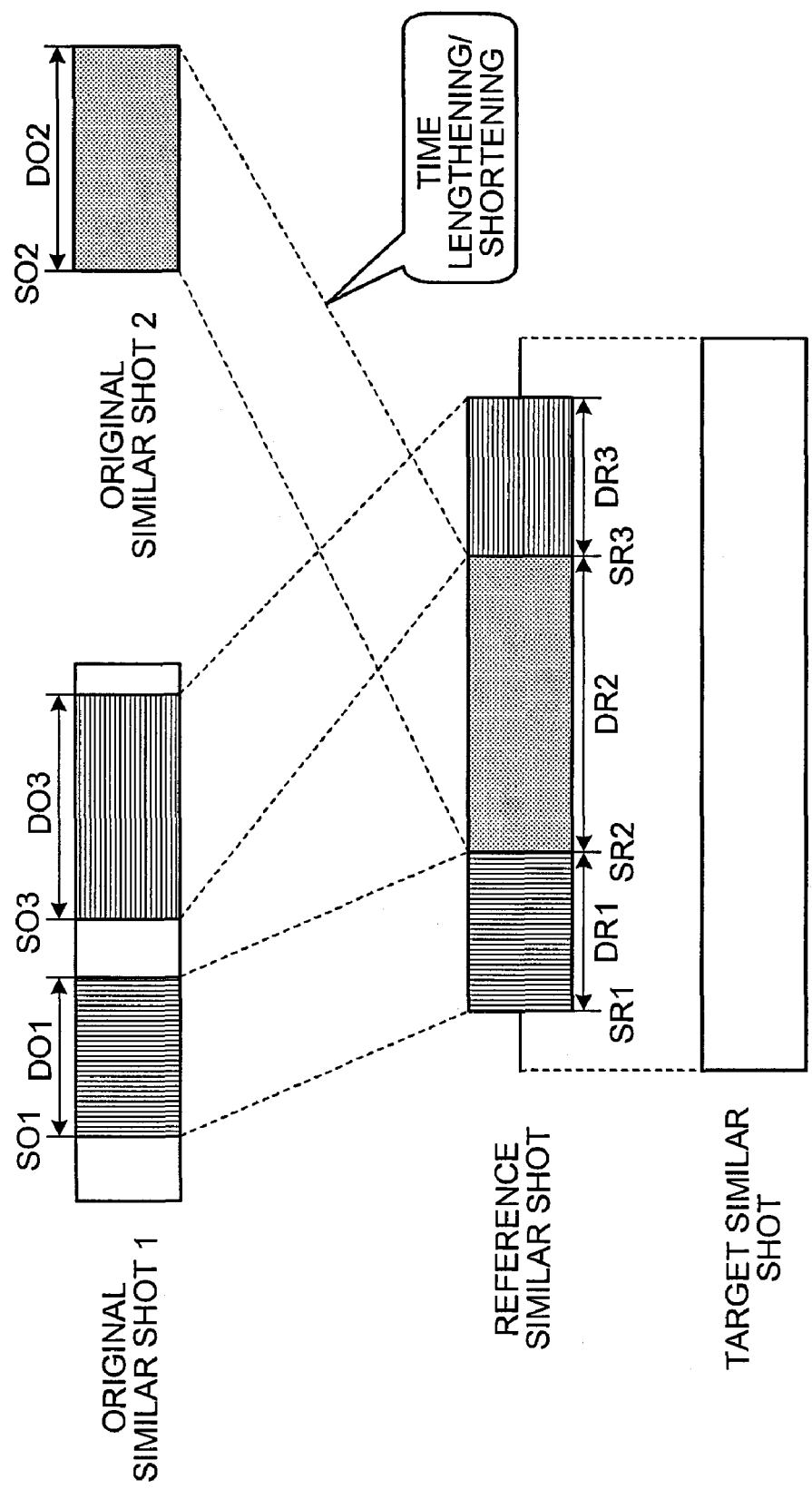
FIG. 9 is an explanatory diagram of a method of generating the reference similar shot (when plural original similar shots are used)

(Generation of Reference Similar Shot-Method 3) Plural Original Similar Shots are Used As shown in FIG. 9, it is a method of generating a partial section of the reference similar shot by lengthening or shortening the entire or partial section of plural original similar shots. In the illustrated example, partial sections of the original similar shot 1 and an entire section of the original similar shot 2 are used to respectively generate a part of the reference similar shot. In the case of this method, required as the reference-similar-shot generating information are, for each part constituting the reference similar shot (three parts in the illustrated example), the above start time SRn and the duration DRn, the original similar shot ID, the start time SOn and the duration DOn (see FIG. 6). It is desirable that the describing order is the time order of each part.

Figure 10:
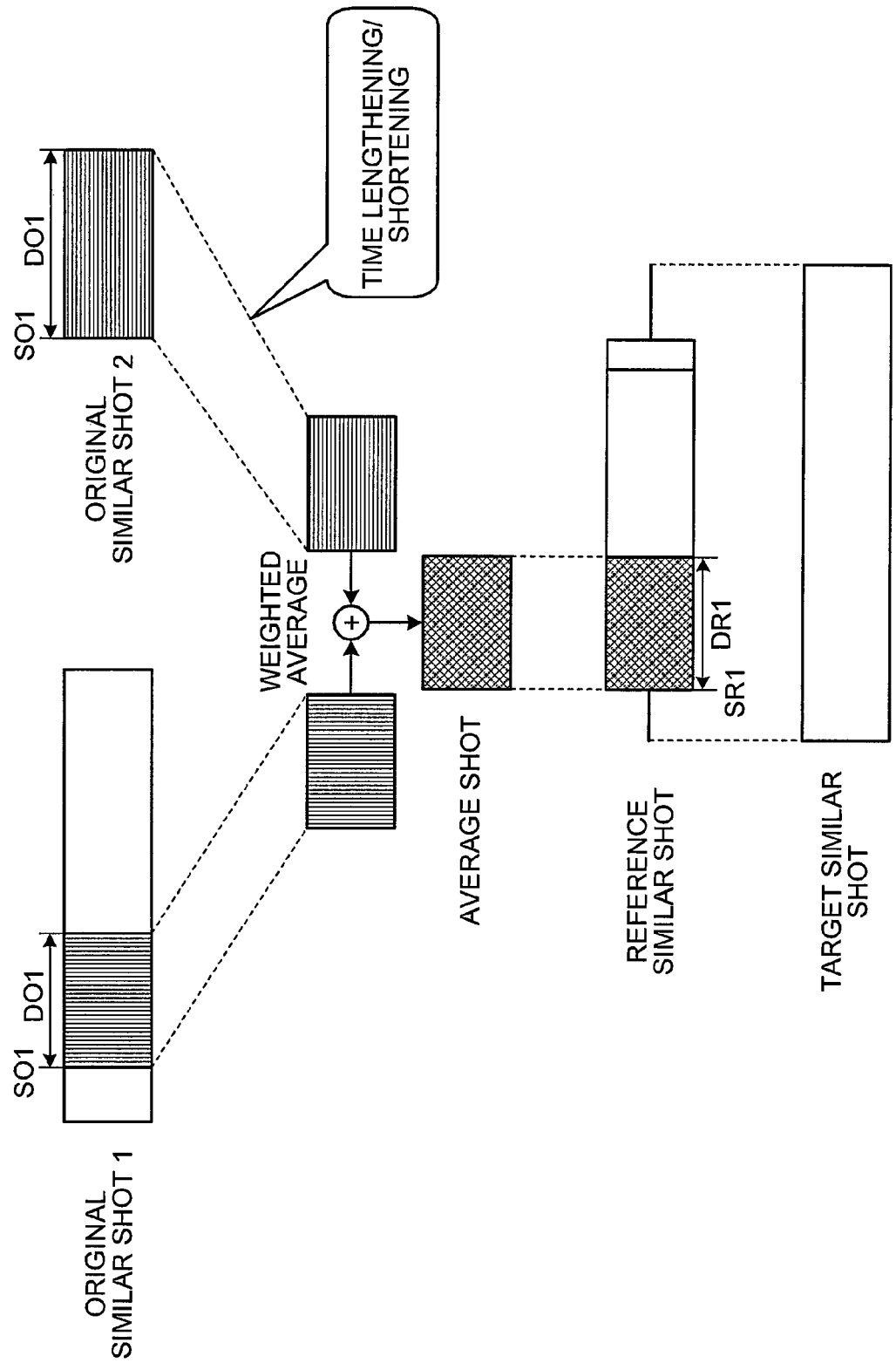
FIG. 10 is an explanatory diagram of a method of generating the reference similar shot (when plural original similar shots are weighted-averaged to be used)

(Generation of Reference Similar Shot-Method 4) Plural Original Similar Shots are Weighted-Averaged and Used As shown in FIG. 10, it is a method of weighted-averaging an entire or partial section of plural original similar shots that are lengthened or shortened and weighted-averaged to generate an "average shot" from which an entire or partial section of the reference similar shot is generated. In the illustrated example, the beginning part of the reference similar shot is generated from the average shot that is an average of the partial section of the original similar shot 1 that is lengthened or shortened and the entire section of the original similar shot 2 that is lengthened or shortened. The middle and the last sections are respectively generated from the average of plural original similar shots (that are not limited to two). A weighting coefficient may be constant for a shot to be averaged or independently determined for each frame. When the weighting coefficient is constant among shots or frames, the weighted average becomes simple average. However, the simple average is regarded as one kind of the weighted average (an exceptional case of the weighted average).

Figure 11:
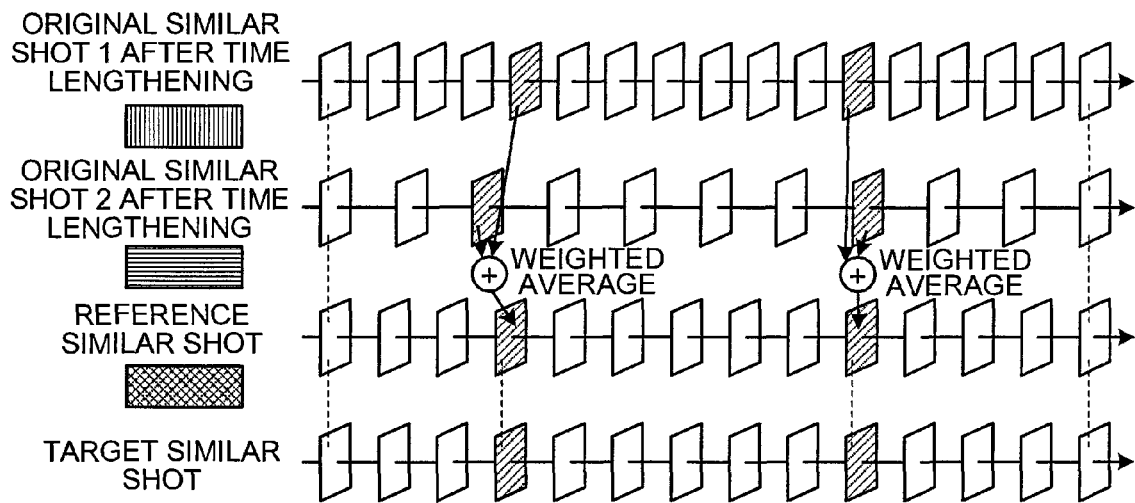
FIG. 11 is an explanatory diagram of an example of a calculation of a weighted average between shots having different frame positions.

When positions of the frames to be averaged are identical, the weighted average of the frames located at the same position is simply calculated. On the other hand, when the positions of the frames are not identical, as shown in FIG. 11, for example, two frames temporally closest to a target frame of the target similar shot are weighted-averaged to generate, as the reference similar shot, an average shot of which frame position is identical to that of the target similar shot. The weighted coefficient may be constant for each shot to be averaged or independently determined for each frame (in the latter case, the weight is determined according to a distance to the above target frame).

In a case in which this method is adopted, required for the reference-similar-shot generating information are the above start time SRn and the duration DRn for each section constituting the reference similar shot (three sections in the illustrated example), and the original similar shot ID, the start time SOn, the duration DOn, and the weighting coefficient for each original similar shot to be the partial section of the reference similar shot (see FIG. 6). Specifically, there is a cross-fade as an adaptation example of this method in which a reference similar shot that well matches the target similar shot can be generated without changing the original similar shot to be used or sections thereof, but by changing the weighting coefficient of each section.

(Generation of Reference Similar Shot-Method 5) Combination of Above Methods 1 to 4

Each shot is encoded by an optimal method among the methods 1 to 4. In this case, required for the reference-similar-shot generating information is a method ID specifying which method is used to generate the reference similar shot besides the information required for each method (above SRn, DRn, SOn, DOn, original-reference-shot ID, weighting coefficient, etc.) (see FIG. 6).

Figure 12:
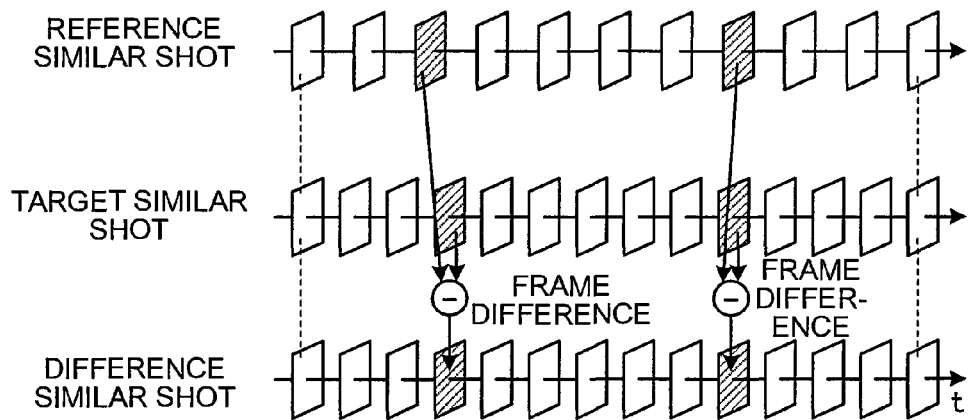
FIG. 12 is an explanatory diagram of an example of a calculation of a difference between shots having different frame positions.

As explained above, in the present invention, a shot (hereinafter, "difference similar shot") obtained by subtracting the reference similar shot generated by the above each method from the target similar shot is encoded. At this time, when frame positions of the target similar shot and the reference similar shot are identical, a difference between the frames at the same position is simply calculated. However, when the frame positions are not identical, for example, as shown in FIG. 12, a difference between each frame in the target similar shot and a frame in the reference similar shot that are temporally closest to each other is calculated.

EXAMPLE 1

Figure 13:
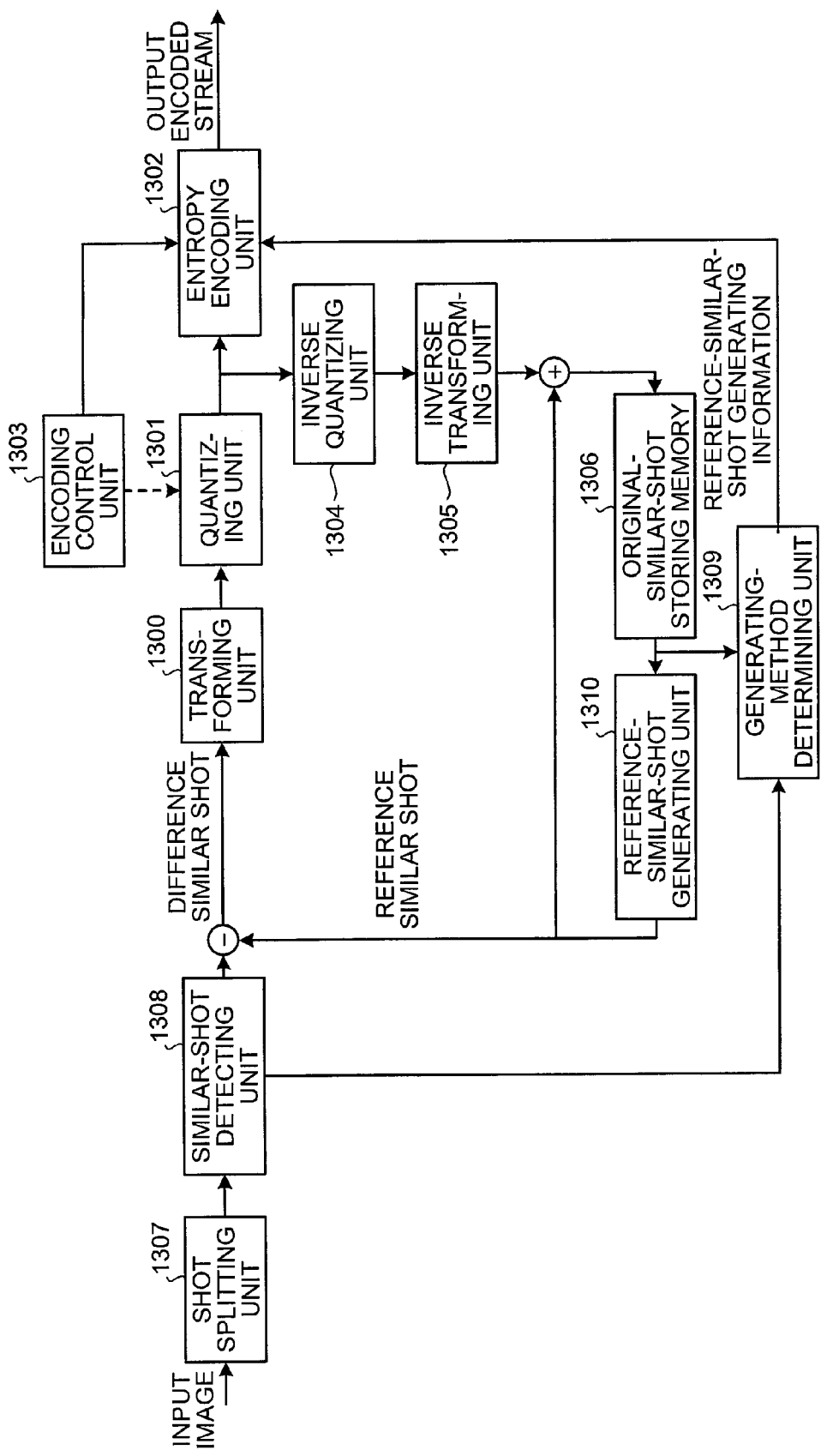
FIG. 13 is an explanatory diagram of an example of a configuration of an image processing device (encoder) according to example 1 of the present invention.
Figure 14:
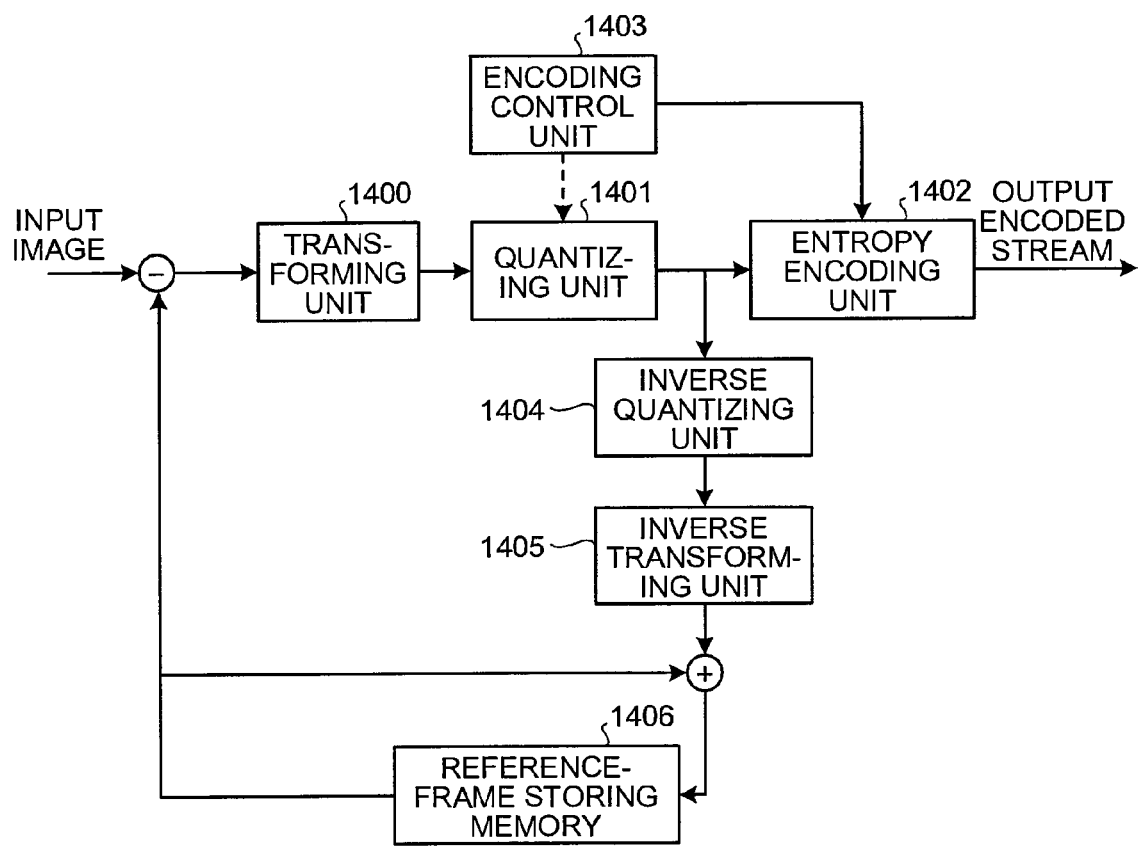
FIG. 14 is an explanatory diagram of an example of a configuration of a conventional JPEG/MPEG encoder (without motion compensation)

FIG. 13 is an explanatory diagram of an example of a configuration of an image processing device (encoder) according to example 1 of the present invention. FIG. 14 is an explanatory diagram of an example of a configuration of a conventional JPEG/MPEG encoder (without motion compensation).

Reference numerals 1300 to 1305 shown in FIG. 13 are identical to like units shown in FIG. 14. In other words, the reference numeral 1300/1400 represents a transforming unit that performs a discrete cosine transform (DCT) and a discrete wavelet transform (DWT) on (prediction error obtained by subtracting a reference frame from) a frame to be encoded. Reference numeral 1301/1401 represents a quantizing unit that quantizes the data after the transformation in a predetermined step width. Reference numeral 1302/1402 represents an entropy encoding unit that encodes the data after the quantization (irrespective of technique, in particular). Reference numeral 1303/1403 represents an encoding control unit that determines various encoding types and quantizing steps for rate control. Reference numeral 1304/1404 represents an inverse quantizing unit that inverse quantizes data after the quantization before the encoding. Reference numeral 1305/

1405 represents an inverse transforming unit that further inverse transforms data after the inverse quantization.

Reference numeral 1306 represents an original-similar-shot storing memory that temporarily stores, for at least one shot, the reference frame added to a frame after the reverse transformation, i.e., a locally decoded image. A reference-frame storing memory 1406 that stores a locally decoded image is also shown in FIG. 14. The difference is that the reference-frame storing memory 1406 of the conventional technique stores the image in units of frames, while the original-similar-shot storing memory 1306 of the present invention stores the image in units of shots. The number of (the total number of frames included in) the original similar shots stored in the original-similar-shot storing memory 1306 is limited according to memory capacity upon implementation, but not algorithmically limited.

Reference numeral 1307 represents a shot splitting unit serving as a functional unit that splits the image to be encoded into plural shots. Reference numeral 1308 represents a similar-shot detecting unit serving as a functional unit that calculates similarity of the shots split by the shot splitting unit 1307, and classifies the shots into plural groups (similar shot groups) based on the similarity.

Reference numeral 1309 represents a generating-method determining unit that compares the target similar shot and the original similar shot stored in the original-similar-shot storing memory 1306 (matching) and determines a reference-similar-shot generating method (with respect to which section of the target similar shot the reference similar shot is generated, or which section of which original similar shot is used for the generation). Ideally, an optimal method, i.e., a method by which a value of the difference similar shot converges as close to 0 as possible is searched for; however, the procedure thereof is not referred to in the present invention. Color histograms, global motion information of entire frames, or motion vector information in units of blocks is used for an estimation index in addition to the above similarity.

Reference numeral 1310 represents a reference-similar-shot generating unit that generates a reference similar shot from the original similar shot stored in the original-similar-shot storing memory 1306 according to the method determined by the generating-method determining unit 1309.

Figure 15:
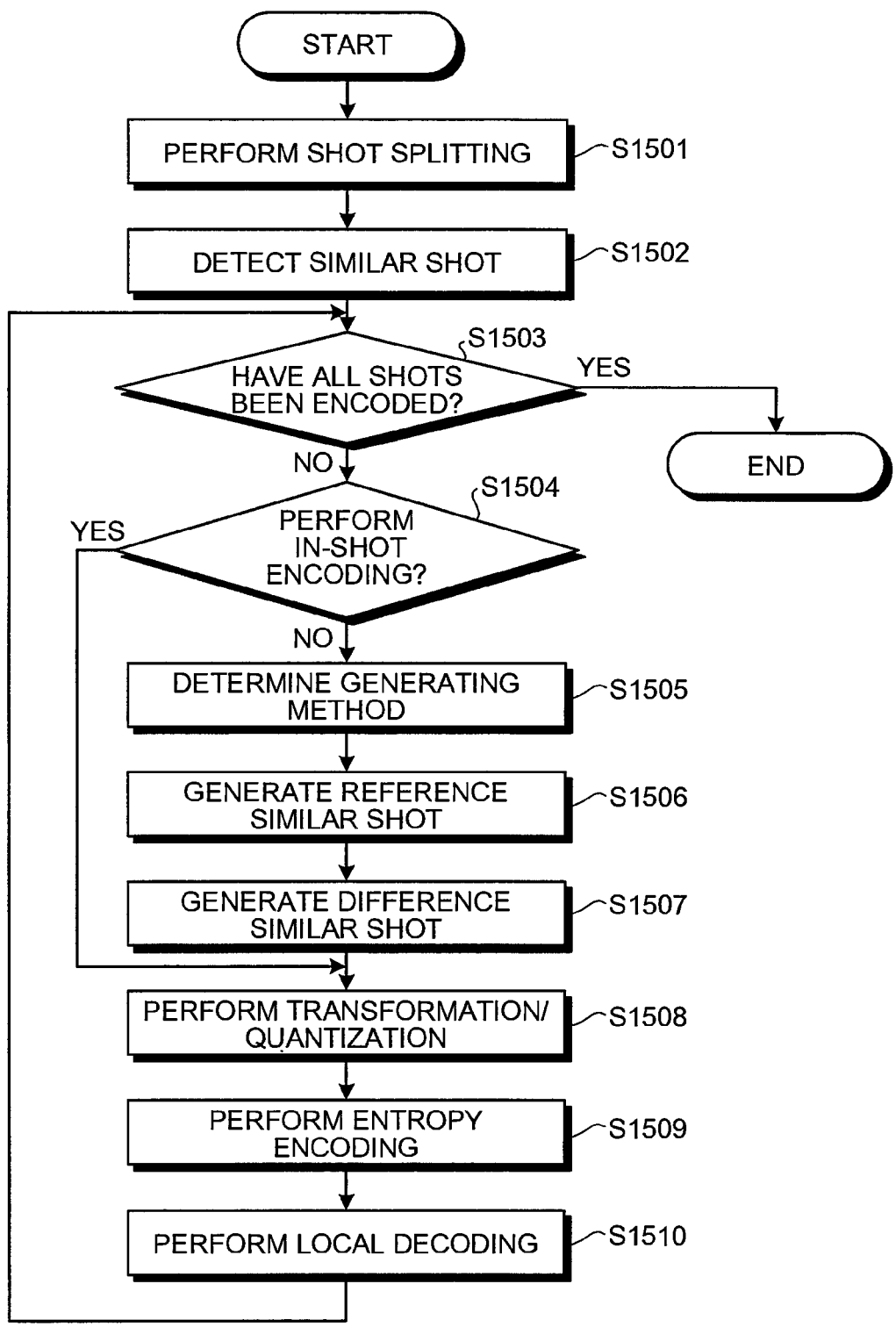
FIG. 15 is a flowchart of an image encoding process performed by the image processing device (encoder) according to the example 1 of the present invention.

FIG. 15 is a flowchart of an image encoding process performed by the image encoding device (encoder) according to example 1 of the present invention. Firstly, the shot splitting unit 1307 splits an image to be encoded into plural shots (step S1501). Next, the similar-shot detecting unit 1308 detects a similar shot of each shot, i.e., classifies each shot into plural groups based on the similarity between the shots (step S1502).

When there is an unprocessed shot (that has not been encoded) (step S1503: NO), the process from steps S1503 to S1510 is repeated. It is judged whether the target similar shot is a shot for in-shot encoding, i.e., a shot to be encoded without reference to another shot.

At least one shot among plural similar shots has to be encoded. In the group A shown in FIG. 1, for example, the shot "A0" is the pertinent shot and for the pertinent shot, each frame in the shot, as is, is transformed/quantized by the transforming unit 1300/the quantizing unit 1301 (step S1504: YES, step S1508), and entropy-encoded by the entropy-encoding unit 1302 (step S1509). The data after the transformation and the quantization is locally-decoded (inverse-quantized and inverse-transformed) by the inverse-quantizing unit 1304 and the inverse-transforming unit 1305 (step S1510).

On the other hand, with respect to the shots "A1" to "A4" that refer to other similar shots (step S1504: NO), the generating-method determining unit 1309 determines a reference-similar-shot generating method (step S1505), and the reference-similar-shot generating unit 1310 generates the reference similar shot (step S1506) and the difference similar shot, i.e., a difference between the target similar shot and the reference similar shot (step S1507). The difference similar shot is entropy-encoded by the entropy-encoding unit 1302 (step S1509) and locally decoded (inverse-quantized and inverse-transformed) by the inverse quantizing unit 1304/the inverse transforming unit 1305 (step S1510).

When all of the shots in the image have been encoded (step S1503: YES), the process of the flowchart ends. The reference-similar-shot generating information (see FIG. 6) corresponding to the generating method determined by the generating-method determining unit 1309 is encoded by the entropy-encoding unit 1302, and multiplexed with a shot encoded stream (encoded data of each shot) to become one encoded stream. The present invention does not refer to a multiplexing method. Since whether the multiplexing of the shot encoded stream and the reference similar shot is necessary depends on an application, these may not be multiplexed and transmitted as separate streams.

Since splitting and classifying of shots is performed by scanning the entire target image at first in the present invention, image encoding by multipath is enabled, in other words, the present invention is suitable for image encoding in a field in which encoding delay is irrelevant. Image encoding of distribution media (such as a next generation optical disc), transcoding (such as data compression and moving to a memory card) of contents stored in a storage medium are applications of the present invention. The present invention can be utilized for broadcast image encoding of broadband streaming and recorded (encoded) programs.

Figure 16:
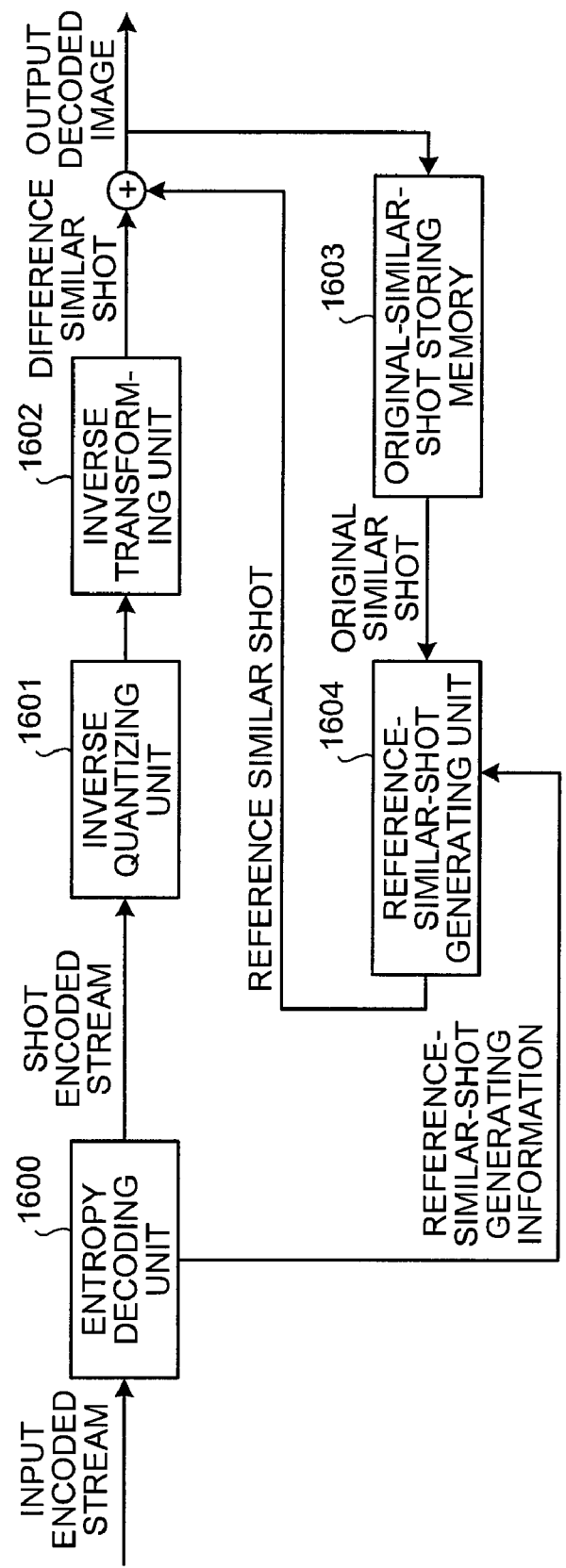
FIG. 16 is an explanatory diagram of an example of a configuration of an image processing device (decoder) according to the example 1 of the present invention.

Next, decoding of the image encoded in the above manner will be explained. FIG. 16 is an explanatory diagram of an example of a configuration of the image processing device (decoder) according to example 1 of the present invention. Reference numeral 1600 represents an entropy decoding unit that decodes an input encoded stream, and respectively outputs the shot encoded stream after the decoding and the reference-similar-shot generating information to the inverse quantizing unit 1601 and the reference-similar-shot generating unit 1604, respectively. Reference numeral 1601 represents an inverse quantizing unit that inverse-quantizes the shot encoded stream. Reference numeral 1602 represents an inverse transforming unit that further inverse-transforms the shot encoded stream after the inverse-quantization.

Reference numeral 1603 represents an original-similar-shot storing memory that stores at least one shot of the decoded image. Reference numeral 1604 represents a reference-similar-shot generating unit that generates the reference similar shot from the original similar shot stored in the original-similar-shot storing memory 1603 according to the reference-similar-shot generating information input by the entropy decoding unit 1600.

Figure 17:
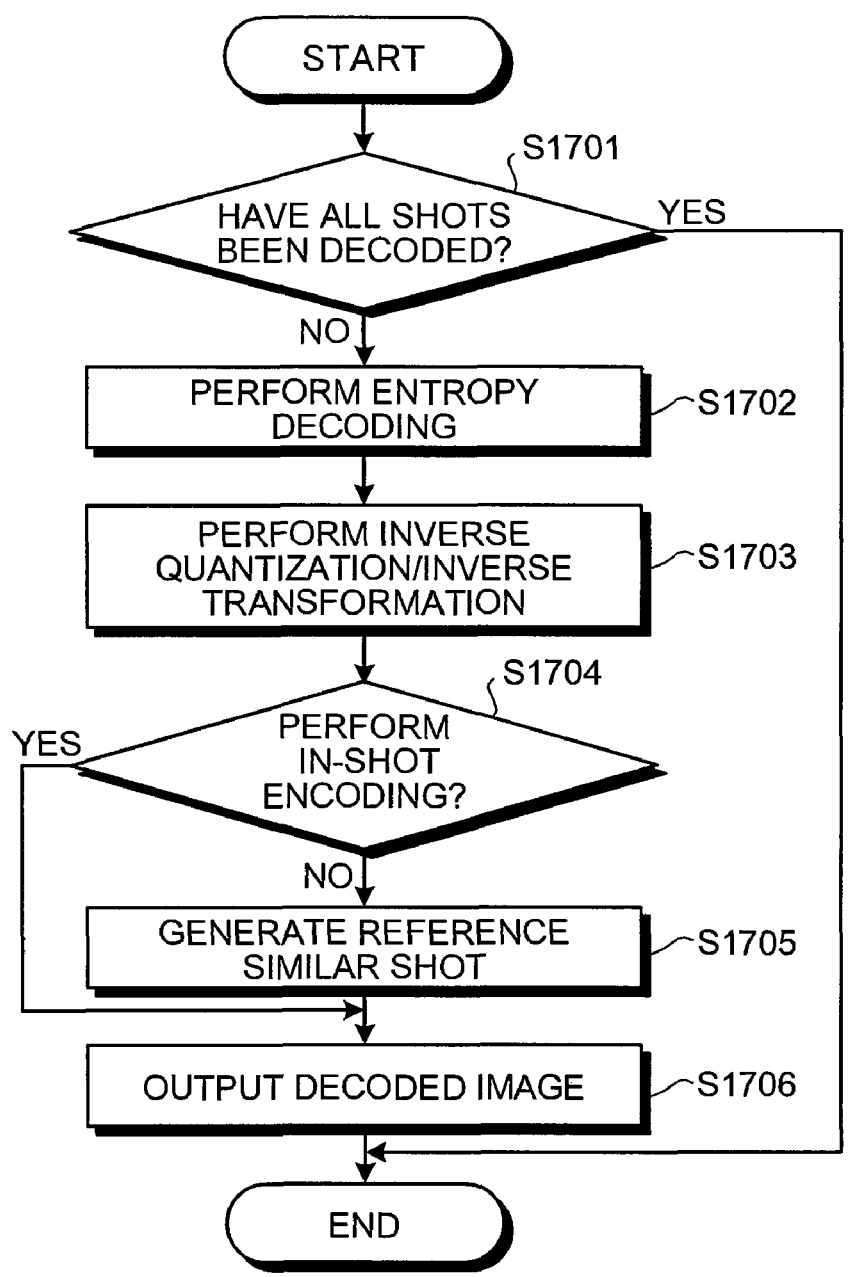
FIG. 17 is a flowchart of an image decoding process performed by the image processing device (decoder) according to the example 1 of the present invention.

FIG. 17 is a flowchart of an image decoding process performed by the image processing device (decoder) according to example 1 of the present invention. As long as there is an unprocessed (undecoded) shot (step S1701: NO), the entropy decoding unit 1600 decodes the unprocessed shot included in the encoded stream (step S1702), the inverse quantizing unit 1601 inverse-quantizes the decoded shot, and the inverse transforming unit 1602 inverse-transforms the inverse-quantized shot (step S1703).

When the above shot is in-shot-encoded, i.e., a shot encoded without referring to another shot (step S1704: YES), the data after the inverse transformation is output as the decoded image (step S1706). On the other hand, when the above shot is a shot encoded with reference to another shot (step S1704: NO), the reference-similar-shot generating unit 1604 generates the reference similar shot from the decoded image (original similar shot) stored in the original-similar-shot storing memory 1603 according to the reference-similar-shot generating information input by the entropy decoding unit 1600 (step S1705). The difference similar shot output from the inverse transforming unit 1602 to which the reference similar shot is added is output as the decoded image (step S1706).

EXAMPLE 2

Figure 18:
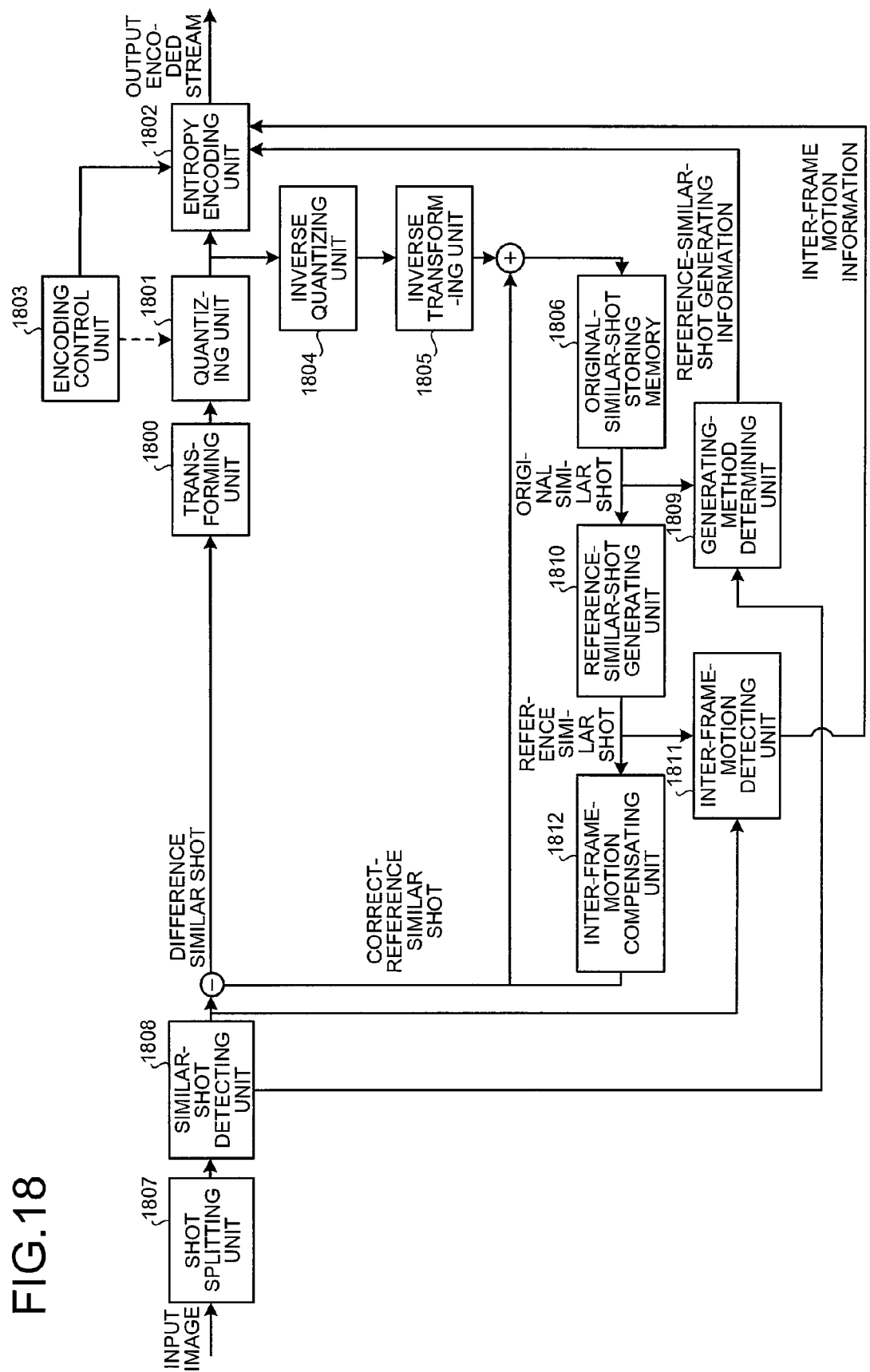
FIG. 18 is an explanatory diagram of an example of a configuration of an image processing device (encoder) according to example 2 of the present invention.
Figure 19:
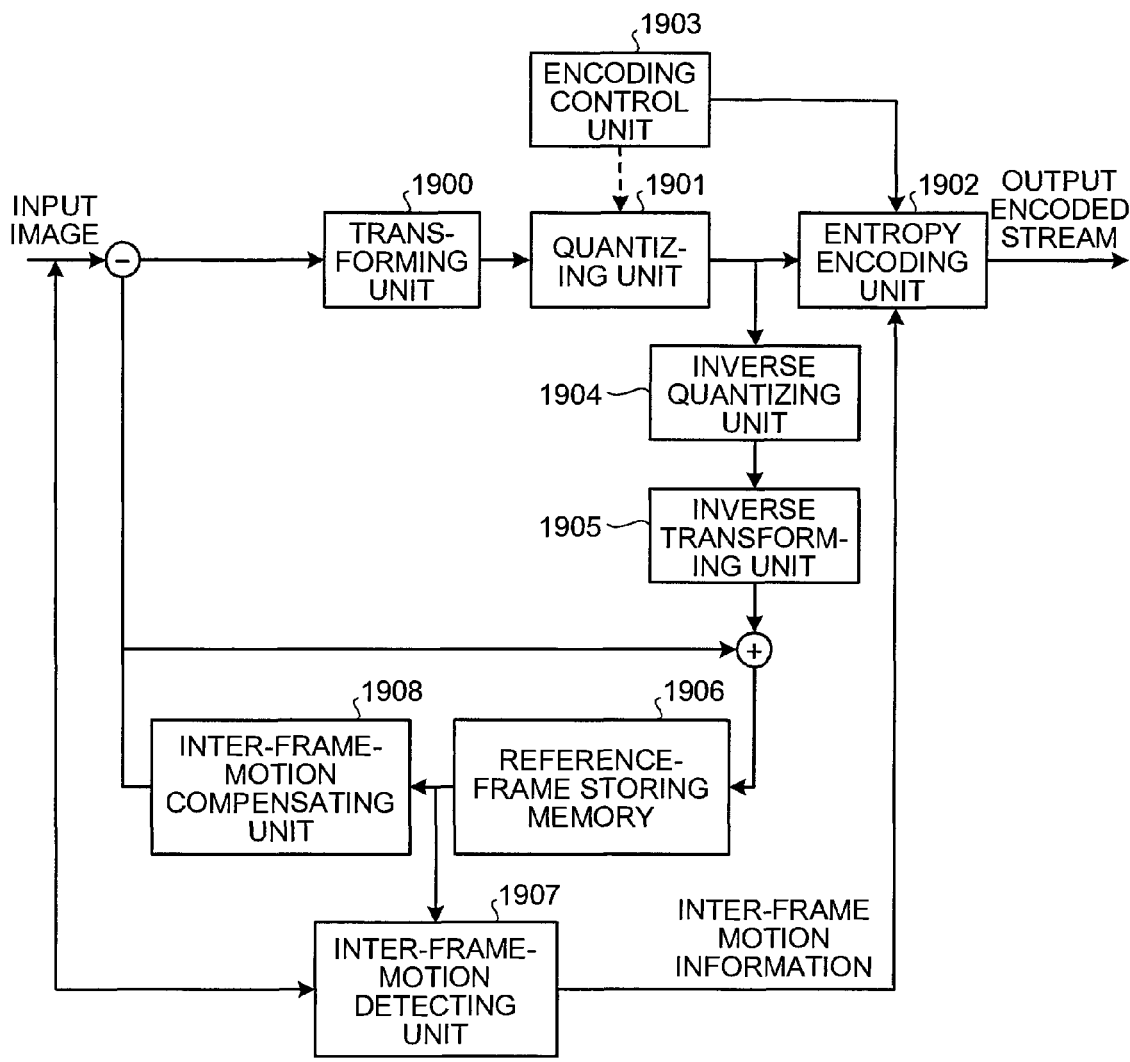
FIG. 19 is an explanatory diagram of an example of a configuration of a conventional JPEG/MPEG encoder (with motion compensation)

Though the difference between each frame in the target similar shot and a corresponding frame in the reference similar shot is simply calculated in example 1 above, further enhancement of encoding efficiency is expected by performing motion compensation between frames at that time. FIG. 18 is an explanatory diagram of an example of a configuration of an image processing device (encoder) according to example 2 of the present invention. FIG. 19 is an explanatory diagram of an example of a configuration of a conventional JPEG/MPEG encoder (with motion compensation).

In the configuration of FIG. 18, the reference-frame storing memory 1906 of the conventional JPEG/MPEG encoder is replaced with the original-similar-shot storing memory 1806, and a shot splitting unit 1807, a reference-shot detecting unit 1808, a generating-method determining unit 1809 and a reference-similar-shot generating unit 1810 are added (since functions of the units other than the above units, i.e., a transforming unit 1800, a quantizing unit 1801, an entropy encoding unit 1802, an encoding control unit 1803, an inverse quantizing unit 1804, and an inverse transforming unit 1805 are the same as the functions of like units shown in FIG. 19, i.e., the conventional technique, thereby omitting explanation thereof). In other words, an inter-frame-motion detecting unit 1811 and an inter-frame-motion compensating unit 1812 are added to the configuration of the encoder shown in FIG. 13.

Although the present invention does not refer to a method of inter-frame-motion compensation prediction, conventional methods roughly include following two methods.
(Inter-Frame-Motion Compensation Prediction-Method 1)
Global Motion Compensation Prediction (FIG. 20)

In this technique, a quadrilateral region inside a reference frame is warped to a rectangular region in a frame to be encoded (by parallel displacement, scaling, rotation, affine transformation, perspective transform and the like). Specific examples include "sprite decoding", in Chapter 7.8 in MPEG-4 (ISO/IEC 14496-2). This global motion compensation prediction enables the motion of the entire frame to be grasped and misalignment or deformation of an object inside the frame to be corrected.
(Inter-Frame-Motion Compensation Prediction-Method 2)
Motion Compensation Prediction Per Block (FIG. 21)

In this technique, a frame to be encoded is split into square grid blocks, and then, each of the blocks is warped in the same manner as in technique (1). In the case of parallel displacement as one example of the warping, a region having a smallest error inside a reference frame is searched according to block, and thereafter, misalignment between each of the blocks in the frame to be encoded and each of the searched regions in the reference frame is transmitted as motion vector information. The size of the block is 16×16 pixels (referred to as a "macro block") in MPEG-1 or MPEG-2. Otherwise, a small block such as 8×8 pixels in MPEG-4 or 4×4 pixels in H.264 may be allowed. Incidentally, the reference frame is not limited to one, and therefore, an optimal region may be selected from plural reference frames. In this case, a reference frame ID also must be transmitted in addition to the motion vector information. The local motion of an object inside of the frame can be coped with by the motion prediction according to block.

Figure 22:
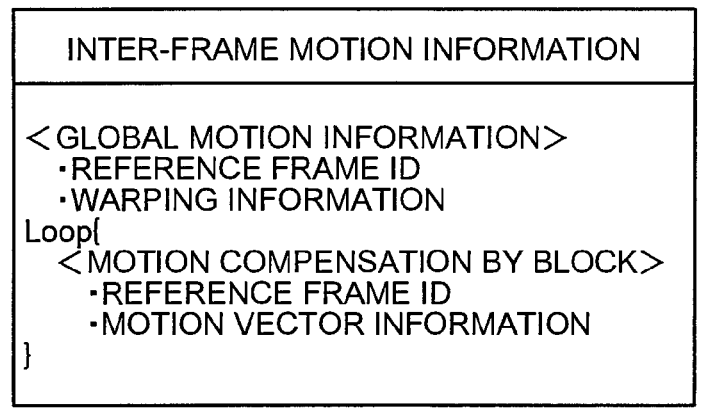
FIG. 22 is an explanatory diagram of an example of inter-frame motion information.

A specific example of inter-frame motion information required on the decoding side (required to be incorporated in the encoded stream) when performing the above inter-frame-motion compensation prediction is shown in FIG. 22. Though the global motion prediction and motion prediction by block are combined in the illustrated example, only one prediction may be used, of course.

To explain the method of the inter-frame motion compensation more specifically, inter-frame motion information (for example, affine transformation coefficient and motion vector information) between each frame in the target similar shot and at least one frame in the reference similar shot is calculated by the inter-frame-motion detecting unit 1811 firstly. Then, the inter-frame-motion compensating unit 1812 generates each frame in correct-reference similar shot (prediction frame with respect to each frame in the target similar shot) from the reference similar shot based on the inter-frame motion information.

When the frame positions between the target similar shot and the reference similar shot are identical, the frame positions between the target similar shot and the correct-reference similar shot become naturally identical. As a result, each frame in the target reference shot from which each frame in the correct reference similar shot that is located at the same position is subtracted is simply encoded. In other words, by enhancing the similarity between the reference similar shot and the target similar shot by the motion compensation prediction, a value of the difference similar shot can be further converged to a neighborhood of zero. The inter-frame-motion information is multiplexed with the shot encoded stream to become one encoded stream.

Figure 23:
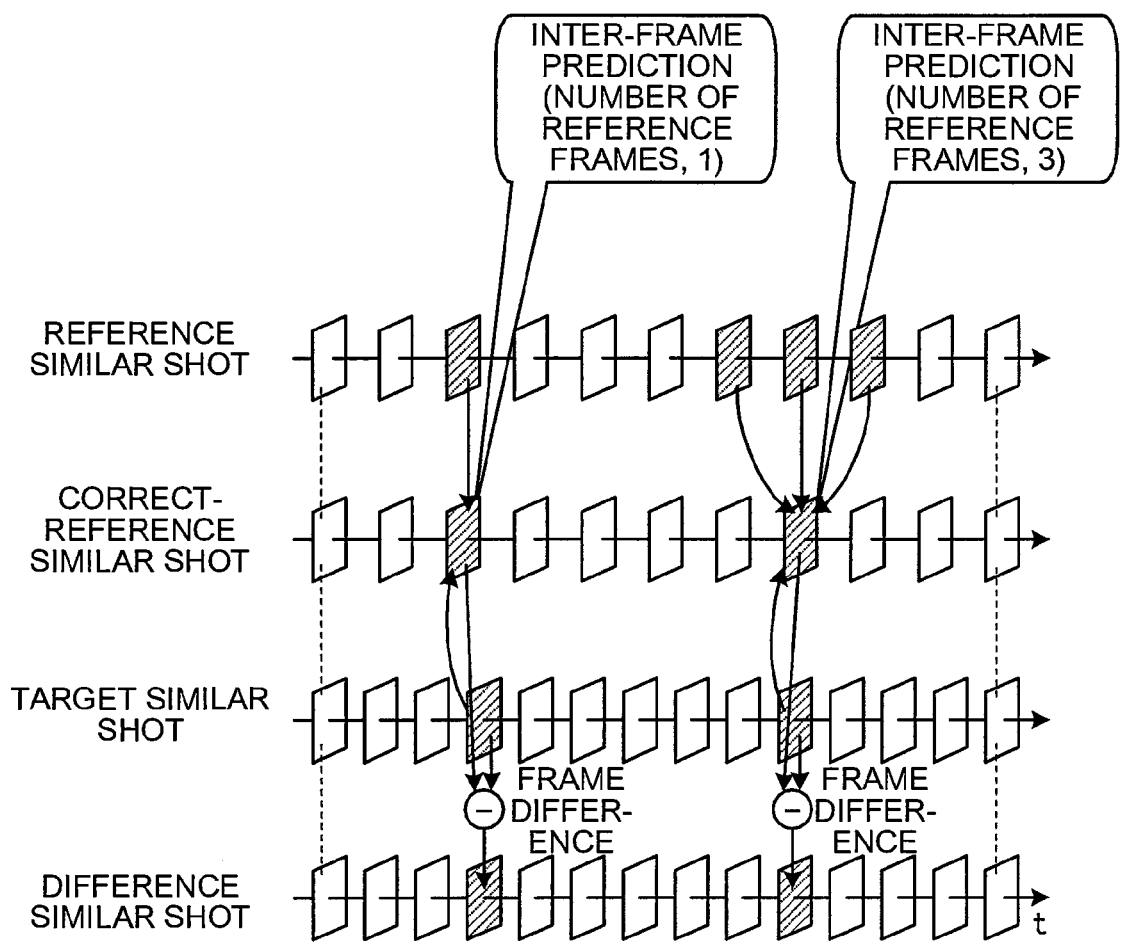
FIG. 23 is an explanatory diagram of a method of generating a correct-reference similar shot (when a frame position is not corrected)
Figure 24:
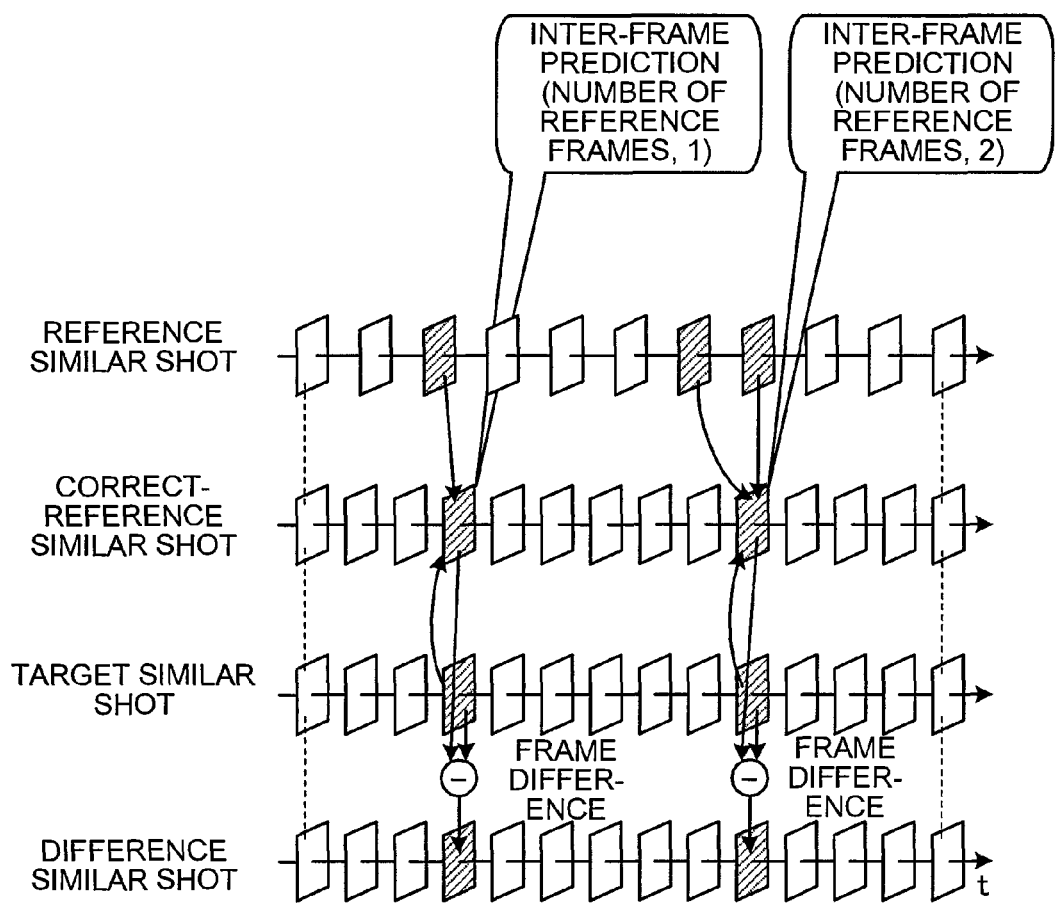
FIG. 24 is an explanatory diagram of a method of generating the correct-reference similar shot (when the frame position is corrected)

On the other hand, when the frame positions between the target similar shot and the reference similar shot are not identical, processing to correct the frame position is necessary. For example, the following two methods are considered, but a method of generating a correct-reference similar shot is not limited to the following methods.
(Generation of Correct-Reference Similar Shot-Method 1)
When Frame Position is not Corrected As shown in FIG. 23, motion detection is performed between each frame in the target similar shot and at least one frame in the reference similar shot. Inter-frame motion compensation is performed on the reference similar shot based on the obtained inter-frame motion information to generate each frame of the correct-reference similar shot. At this time, the frame positions of the correct-reference similar shot and the reference similar shot are identical (the frame position of the reference similar shot is stored). In this case, a difference between the frame in the correct-reference similar shot that is temporally closest to the target frame in the target similar shot and the target frame is encoded.
(Generation of Correct-Reference Similar Shot-Method 2)
When Frame Position is Corrected As shown in FIG. 24, it is a method of generating each frame in the correct-reference similar shot by inter-frame motion compensation in a similar manner as method 1 and correcting (interpolating or thinning) each frame position of the correct-reference similar shot such that the each frame position of the correct reference similar shot is identical to that of the target similar shot. In this case, a difference between each frame in the target similar shot and each frame in the correct-reference similar shot that are located at the same position may be encoded.

Figure 25:
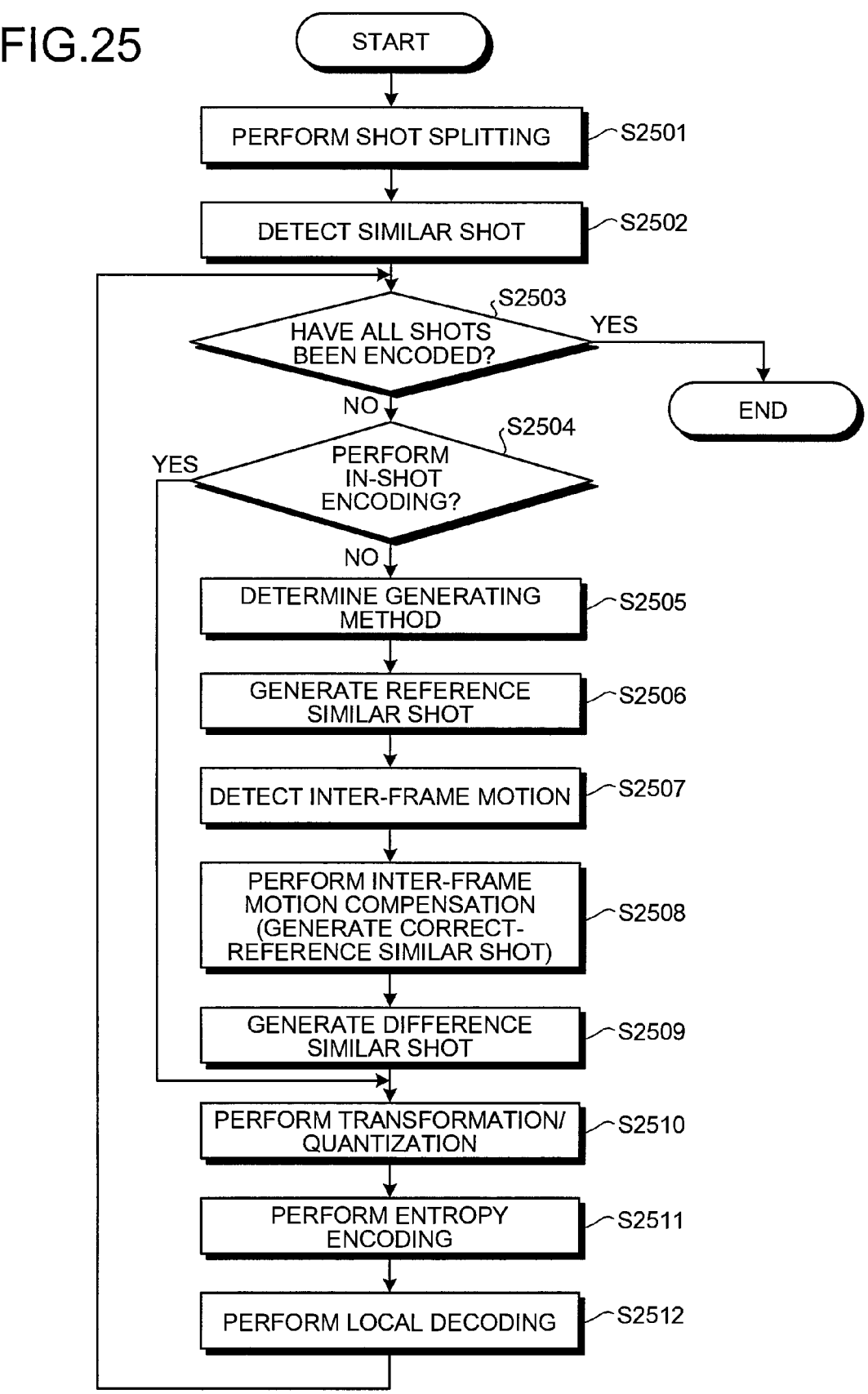
FIG. 25 is a flowchart of an image encoding process performed by the image processing device (encoder) according to the example 2 of the present invention.

FIG. 25 is a flowchart of an image encoding process performed by the image processing device (encoder) according to example 2 of the present invention. The difference between this process and the image encoding process according to example 1 shown in FIG. 15 is that an inter-frame-motion detecting process (step S2507) and an inter-frame-motion compensating process/correct-reference-similar-shot generating process (step S2508) are added after generating the reference similar shot (step S2506). The difference similar shot is generated by subtracting the correct-reference similar shot generated at step S2508 from the target similar shot (step S2509). The processes corresponding to steps other than steps S2507 to S2509, i.e., steps S2501 to S2506 and steps S2510 to S2512 are identical to the like steps shown in FIG. 15.

Figure 26:
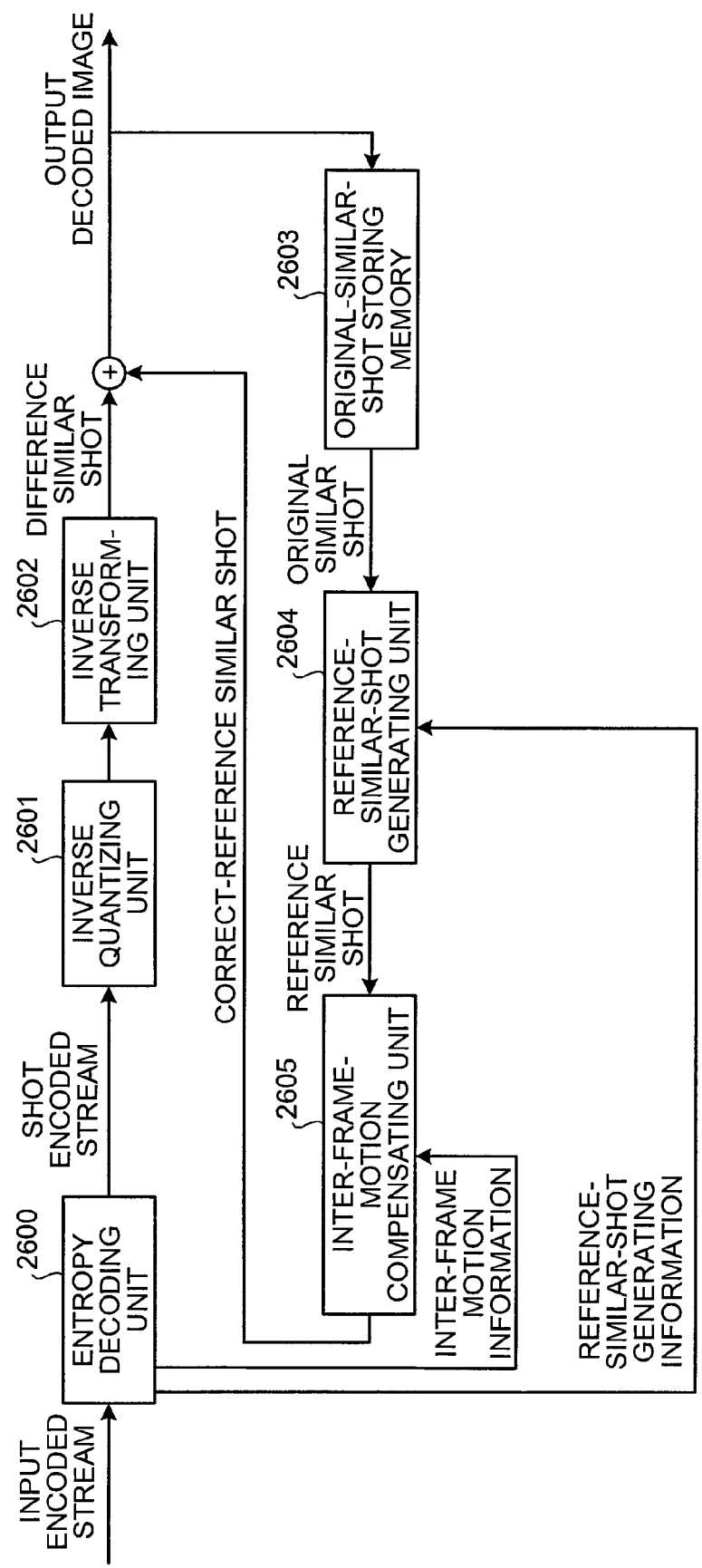
FIG. 26 is an explanatory diagram of an example of a configuration of an image processing device (decoder) according to the example 2 of the present invention.

Next, decoding of the image encoded in the above manner will be explained. FIG. 26 is an explanatory diagram of an example of a configuration of the image processing device (decoder) according to example 2 of the present invention. The difference between this decoder and the decoder of example 1 shown in FIG. 16 is that an inter-frame-motion compensating unit 2605 that generates, by motion compensation prediction, the correct-reference similar shot from the reference similar shot generated by a reference-similar-shot generating unit 2604 is added. The functions of the units other than the inter-frame-motion compensating unit 2605, i.e., an entropy decoding unit 2600, an inverse quantizing unit 2601, an inverse transforming unit 2602, an original-similar-shot storing memory 2603, and a reference-similar-shot generating unit 2604 are identical to the functions of the like units shown in FIG. 16, thereby omitting explanation thereof.

Figure 27:
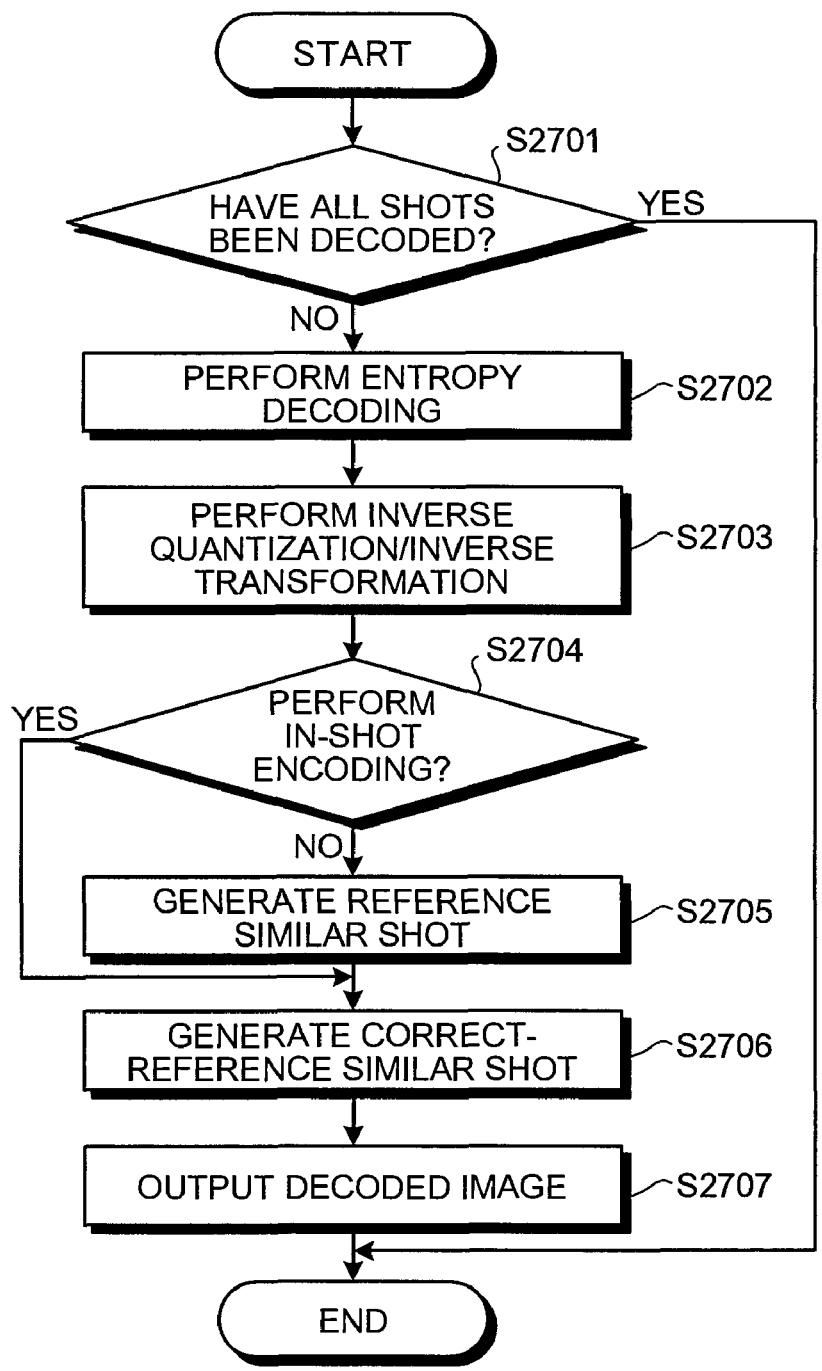
FIG. 27 is a flowchart of an image decoding process performed by the image processing device (decoder) according to the example 2 of the present invention.

FIG. 27 is a flowchart of image decoding process performed by the image processing device (decoder) according to example 2 of the present invention. The difference between this process and the image decoding process of example 1 shown in FIG. 17 is that a correct-reference-similar-shot generating process (step S2706) is added after the generation of the reference similar shot (step S2705). Then, the difference similar shot (to which the correct-reference similar shot output from the inter-frame-motion compensating unit 2605 is added) output from the inverse transforming unit 2602 is output as a decoded image (step S2707). The steps other than steps S2706 and S2707, i.e., steps S2701 to S2705 are identical to the like steps shown in FIG. 17.

According to example 1 explained above, since only the difference between each shot and a similar shot is encoded for each shot in an image, the difference between the target frame and the reference frame is expected to converge to a neighborhood of zero, resulting in reduction of encoding volume.

Although the reduction of encoding volume is preferable, there is a demerit such as sacrifice of random accessibility. In the decoder shown in FIG. 16 or 26, for example, since decoding of a particular shot needs a reference similar shot thereof, an original similar shot used for the generation of the reference similar shot has to be decoded. However, decoding of the original similar shot needs a reference similar shot of the original similar shot and an original reference shot of the reference similar shot. Thus, to prevent reference to reference destination one after another, it is considered to periodically insert shot-encoding method (in-shot encoding) that does not use the reference similar shot into the image. This is the same function as the I-picture in MPEG, for example.

Although the encoder according to example 1 or 2 explained above can be implemented by using conventional JPEG/MPEG encoder, it is necessary to change existing hardware (such as an LSI chip).

Figure 28:
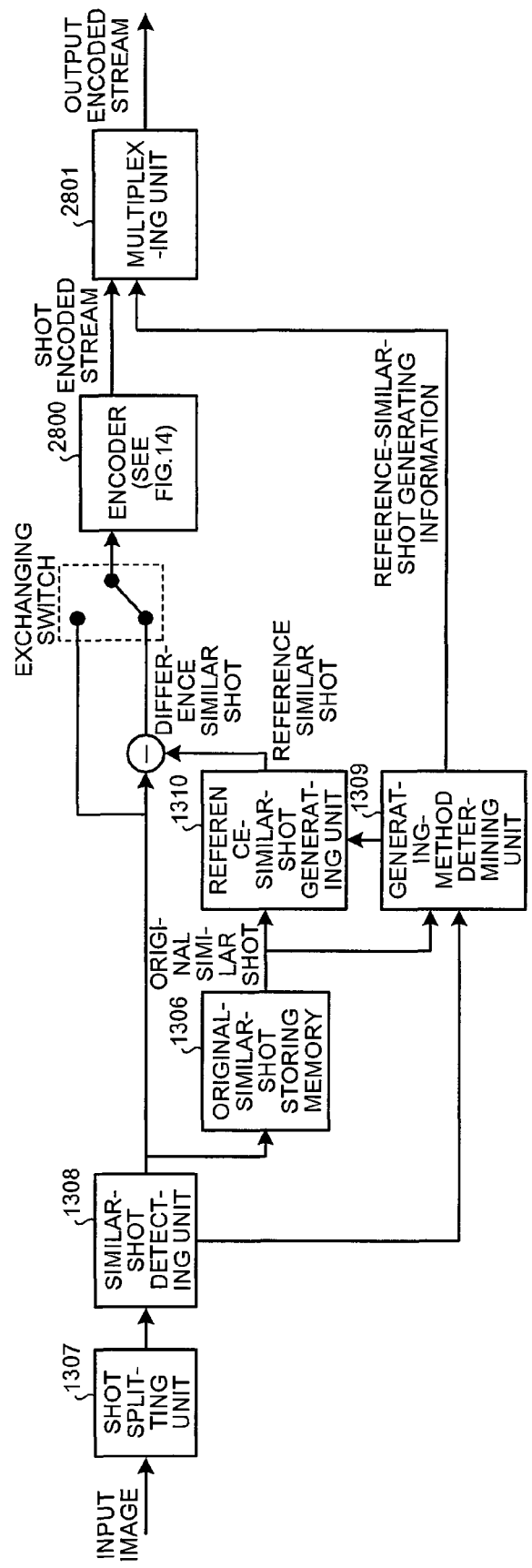
FIG. 28 is an explanatory diagram of another example of a configuration of the image processing device (encoder)

Therefore, as shown in FIG. 28 or 29, for example, the encoder according to the present invention may be implemented by externally mounting a necessary functional unit on a conventional encoder 2800/2900. FIGS. 28 and 29 correspond to FIG. 13 of example 1 and FIG. 18 of example 2, respectively. Specifically, the original-similar-shot storing memory 1306/1806, the shot splitting unit 1307/1807, the similar-shot detecting unit 1308/1808, the generating-method determining unit 1309/1809, the reference-similar-shot generating unit 1310/1810, the inter-frame-motion detecting unit 1811, and the inter-frame-motion compensating unit 1812 are provided upstream of the encoder 2800/2900 to input, to the encoder 2800/2900, the reference similar shot or the difference similar shot after the subtraction of the reference similar shot. And a multiplexing unit 2801/2901 is provided downstream of the encoder 2800/2900 to multiplex the shot encoded stream, the reference-similar-shot generating information, the inter-frame-motion information, and the like (when multiplexing is necessary).

As shown in FIGS. 28 and 29, by providing the reference-similar-shot generating process before the encoding loop, the conventional encoder and encoding method such as MPEG-1/2/4 and H.264 are utilized as they are. However, there is a demerit in the configuration shown such as redundancy of the process between the motion prediction upon generating the reference similar shot and the motion prediction upon the encoding, and difficulty of optimization of the encoder considering both the generation of the reference similar shot and the compression of the difference similar shot.

FIGS. 30 and 31 are examples of implementation of the decoder according to the present invention by externally mounting a necessary functional unit on a conventional decoder 3000/3100. FIGS. 30 and 31 correspond to FIG. 16 of example 1 and FIG. 26 of example 2, respectively. Specifically, a demultiplexing and multiplexing unit 3001/3101 is provided upstream of the decoder 3000/3100 to demultiplex the shot encoded stream, the reference-similar-shot generating information, and the inter-frame-motion information from the input encoded stream. And the original-similar-shot storing memory 1603/2603, the reference-similar-shot generating unit 1604/2604, or the inter-frame-motion compensating unit 2605 is provided downstream of the decoder 3000/3100 to add the reference similar shot or the correct-reference similar shot to the difference similar shot output from the decoder 3000/3100.

EXAMPLE 3

In example 2, the original similar shot is utilized for generating the correct-reference similar shot. In this example 3, even in the case of an object that is not present in the original similar shot, reconfiguration (prediction) is enabled by utilizing a shot other than the original similar shot.

Specifically, it is rare that an object in a frame emerges/disappears instantly. The object is usually present in the frame for a certain time period. Therefore, the object that is not present in the original similar shot has a high possibility of being present in the previous encoded frame in the target similar shot. In other words, by enabling selection of the previous encoded frame in the target similar shot as the reference similar frame, precision of the motion compensation is enhanced, and higher encoding efficiency is expected.

FIG. 32 is an explanatory diagram of an example of a method of inter-frame prediction using the target similar shot as the reference frame. As shown in FIG. 32, in example 3, when performing the inter-frame prediction of the reference similar shot, not only the original similar shot, but also the encoded frame in the target similar shot are used as the reference frame. When generating (encoding) the difference similar shot, the difference between the reference similar shot and the target similar shot is calculated in a similar manner as examples 1 and 2. Hereinafter, three methods of motion prediction compensation of example 3, i.e., inter-frame-motion prediction compensation by selecting a reference frame (selective inter-frame-motion-compensation prediction) are explained.

(Selective Inter-Frame-Motion-Compensation Prediction-Method 1) Original Similar Shot and Target Similar Shot are Used It is the method of predicting an object that is not present in the original similar shot by regarding a frame in the encoded target similar shot as the target frame of the reference similar shot. FIG. 33 is an explanatory diagram of a method of motion compensation prediction including the target similar shot.

As shown in FIG. 33, a frame $C_n$ in the target similar shot and a frame $A_n$ in the original similar shot are approximately identical similar frames. However, an object "sun" present in the frame $C_n$ of the target similar shot is not present in the frame $A_n$ of the original similar shot. Therefore, when motion prediction is performed using the frames $A_n$ and $A_{n-1}$ in the original similar shot as the reference frames, the object "sun" can not be motion-compensated, causing image degradation of or an increase in encoding volume of the object "sun".

On the other hand, the object "sun" is present in a previous encoded frame $C_{n-1}$ of the target similar shot. Therefore, effective motion prediction as a whole including the object "sun" is enabled by selecting, as the reference frame of the frame $C_n$ in the target similar shot, not only the frame shot $A_n$ in the original similar shot, but also the previous encoded frame $C_{n-1}$ in the target similar shot. A difference image (corresponding to a frame in the difference similar shot) between the reference frame $A_n'$ obtained as the above result and the frame $C_n$ in the target similar shot is encoded.

Although it is explained above that one frame $A_n$ in the original similar shot and one previous encoded frame $C_{n-1}$ in the target similar shot are respectively selected when generating the reference frame $A_n'$, plural frames may be respectively selected. Further, the encoded frame is not limited to a temporally previous frame, but may be a temporally subsequent frame such as a B-picture in MPEG to perform motion prediction. In this case, the time order and the encoding order of frames in the reference similar shot become different. Further, not only the above motion compensation prediction by block, but also the global motion compensation prediction may be combined.

As information required for the encoding in method 1, in addition to the information used for the motion prediction compensation in example 2, a flag to identify whether a frame in the original similar shot or an encoded frame is selected as the reference similar frame, or a reference frame ID to identify a reference frame used in the inter-frame motion information. Of course, the reference frame ID may include a function of identifying an original similar shot or an encoded frame in addition to the frame identifying function.

FIG. 34 is an explanatory diagram of an example of a configuration of an image processing device (encoder) according to method 1 of the selective inter-frame-compensation prediction of example 3 of the present invention. The difference between the encoder shown in FIG. 34 and the encoder of example 2 shown in FIG. 18 is that an encoded-shot storing memory 3413 is added upstream of an original-similar-shot storing memory 3406, and a reference-shot selecting unit 3414 is added upstream of an inter-frame-motion compensating unit 3412. Therefore, the functions of units other than the above units, i.e., a transforming unit 3400, a quantizing unit 3401, an entropy encoding unit 3402, an encoding control unit 3403, an inverse quantizing unit 3404, an inverse transforming unit 3405, an original-similar-shot storing memory 3406, a shot splitting unit 3407, a similar-shot detecting unit 3408, a generating-method determining unit 3409, a reference-similar-shot generating unit 3410, an inter-frame-motion detecting unit 3411, and an inter-frame-motion compensating unit 3412 are identical to the functions of like units shown in FIG. 18, thereby omitting explanation thereof.

The encoded-shot storing memory 3413 is a memory that stores an encoded frame in the target shot that is locally decoded to generate the reference similar shot. The number of frames to be stored in the encoded-shot storing memory 3413 depends on an application. Since not only the past frames but also the future frames can be used for generating the encoded frame, the encoding order of frames and the time order of the encoded frames are not identical.

The selecting unit 3414 selects a reference frame for each frame in the target similar shot among the encoded frames or frames in the reference similar shot.

FIG. 35 is a flowchart of an image encoding process performed by the image processing device (encoder) according to method 1 of the selective inter-frame-motion-compensation prediction of example 3 of the present invention. The difference between this process and the image encoding process of example 2 shown in FIG. 25 is that a "reference-frame selecting process" (step S3507) to select the encoded shot or the reference similar shot as the reference frame is added as a process in the case of generating the difference similar shot with reference to another similar shot without the in-shot encoding (step S3504: NO). Steps other than step S3507, i.e., steps S3501 to S3506, and steps S3508 to S3512 are similar to the like steps shown in FIG. 25.

Next, decoding of the image encoded in the above manner will be explained. FIG. 36 is an explanatory diagram of an example of a configuration of the image processing device (decoder) according to method 1 of the selective inter-frame-motion-compensation prediction of example 3 of the present invention. The difference between this decoder and the decoder of the example 2 shown in FIG. 26 is that an encoded-shot storing memory 3606 is added upstream of an original-similar-shot storing memory 3603, and that a reference-frame selecting unit 3607 is added upstream of an inter-frame-motion compensating unit 3605. The functions of units other than the encoded-shot storing memory 3606 and the selecting unit 3607, i.e., an entropy decoding unit 3600, an inverse quantizing unit 3601, an inverse transforming unit 3602, an original-similar-shot storing memory 3603, and an inter-frame-motion compensating unit 3605 are identical to the functions of the like units shown in FIG. 26, thereby omitting explanation thereof.

(Selective Inter-Frame-Motion-Compensation Prediction-Method 2) Difference Information is Used It is a method of generating a frame (feedforward (FF) prediction frame) in the reference similar shot by adding an encoding residual of the previous frame, i.e., the difference similar shot to the original similar shot. The motion compensation prediction is selectively performed on the original similar shot, the encoded target similar shot, and the FF prediction frame.

FIG. 37 is a first explanatory diagram of a method of the FF prediction using the encoding residual. As shown in FIG. 37, information concerning a difference image of a previous frame (difference information) $D_{n-1}$, i.e., a difference between a frame $A_{n-1}$ in the original similar shot and a previous encoded frame $C_{n-1}$ in the target similar shot shows the object "sun" that is not present in a frame $A_n$ in the original similar shot, but present in a frame $C_n$ in the target similar shot. This difference information $D_{n-1}$ is added to the frame $A_n$ to generate a reference frame $A_n'$. Thus, a reference frame including the object "sun" that is not present in the frame $A_n$ in the original similar shot can be generated by regarding the reference frame $A_n'$ as the reference shot. In other words, more precise motion compensation prediction is enabled. Hereinafter, this method is called an "FF prediction of difference image", and the reference frame $A_n'$ generated by this method is called an "FF prediction frame".

FIG. 38 is a second explanatory diagram of the method of the FF prediction using the encoding residual. Referring to FIG. 38, another aspect of method 2 explained in FIG. 37 will be explained. As shown in FIG. 38, when a difference of a difference image (difference information) between the frame $A_n$ and the frame $A_{n-1}$ in the original similar shot is defined as $E_n$, the following expression (1) is obtained.

$$An'=An+Dn-1=An+(Cn-1-An-1)=(An-An-1)+C_{n-1}$$

$$A_n'=An-An-1+Cn-1=Cn-1+En=An+Dn-1 \quad (1)$$

The generation of reference frame in method 2 explained in FIG. 38 (the above FF prediction frame $A_n'$ obtained by adding the difference information $E_n$ of the original similar shot to the previous encoded frame $C_{n-1}$ of the target similar shot) is identical to the method explained in FIG. 37, i.e., the original similar shot $A_n$ to which the previous difference information $D_{n-1}$ is added.

Furthermore, an optimal reference frame may be selected among the frame $A_n$ in the original similar shot, the previous encoded frame $C_{n-1}$ in the target similar shot, and the above FF prediction frame $A_n'$. Moreover, not only the above motion compensation prediction by block, but also the global motion compensation prediction may be combined. The information required for the encoding includes a prediction method identifying flag (original similar shot/encoded frame/FF prediction frame), a reference frame ID to identify a reference frame, motion vector information, etc., and all information is described with respect to all blocks in the frame to be encoded.

FIG. 39 is an explanatory diagram of an example of a configuration of an image processing device (encoder) according to method 2 of the selective inter-frame-compensation prediction of example 3 of the present invention. The difference between the encoder shown in FIG. 39 and the encoder according to method 1 of example 3 shown in FIG. 34 is that an FF prediction frame generating unit 3915 that generates a feedforward prediction frame (hereinafter, "FF prediction frame") based on the encoded frame and a frame in the reference similar shot is added. The encoded frames, the frames in the reference similar shot, and the FF prediction frames are input to a selecting unit 3914. Therefore, functions of other units, i.e., a transforming unit 3900, a quantizing unit 3901, an entropy-encoding unit 3902, an encoding control unit 3903, an inverse-quantizing unit 3904, an inverse-transforming unit 3905, an original-shot storing memory 3906, a shot splitting unit 3907, a similar-shot detecting unit 3908, a generating-method identifying unit 3909, a reference-shot generating unit 3910, an inter-frame-motion detecting unit 3911, an inter-frame-motion compensating unit 3912, an encoded-shot storing memory 3913, and the selecting unit 3914 are identical to the functions of the like units shown in FIG. 34, thereby omitting explanation thereof.

FIG. 40 is a flowchart of an image encoding process performed by the image processing device (encoder) according to method 2 of the selective inter-frame-motion-compensation prediction of example 3 of the present invention. The difference between this process and the image encoding process according to method 1 of example 3 shown in FIG. 35 is that an FF-prediction-image generating process of the difference image (step S4007) is added as a process when the difference similar shot is generated by referring to another similar shot, not by the in-shot encoding (step S4004: NO). Furthermore, upon a reference frame selection (step S4008), an optimal frame is selected among the encoded shot, the reference shot, and the FF prediction image. The steps other than the step S4007, i.e., steps S4001 to S4006 and S4009 to S4014 are identical to like steps shown in FIG. 35.

Next, decoding of the image encoded in the above manner will be explained. FIG. 41 is an explanatory diagram of an example of the image processing device (decoder) according to method 2 of the selective inter-frame-motion-compensation prediction of example 3 of the present invention. The difference between this decoder and the decoder according to method 1 of example 3 shown in FIG. 36 is that an FF-prediction-frame generating unit 4108 that generates an FF prediction frame based on the encoded frame and a frame in the original similar shot is added. Functions of units other than the FF-prediction-frame generating unit 4108, i.e., an entropy decoding unit 4100, an inverse quantizing unit 4101, an inverse transforming unit 4102, an original-similar-shot storing memory 4103, a reference-similar-shot generating unit 4104, an inter-frame-motion compensating unit 4105, an encoded-shot storing memory 4106, and a reference-frame selecting unit 4107 are identical to the functions of the like units shown in FIG. 36, thereby omitting explanation thereof.

(Selective Inter-Frame-Motion Compensation Prediction-Method 3)

This is a method of adapting motion information of the original similar shot to the target similar shot to reduce motion vector information and to achieve improvement of encoding efficiency as a result. FIG. 42 is an explanatory diagram of a method of the feedforward prediction using the motion information of the original similar shot. Hereinafter, motion information between two frames Fn−1 and Fn is represented by M (Fn−1, Fn). Furthermore, a frame generated by performing motion compensation on the frame Fn−1 using the motion information M(Fn−1, Fn) is represented by Fn−1*M(Fn−1, Fn).

If motions of the original similar shot and the target similar shot are identical, the motion information M between the frames $A_{n-1}$ and $A_n$ in the original similar shot and the motion information M between the corresponding frames $C_{n-1}$ and $C_n$ in the target similar shot are assumed as identical as shown in following expression (2).

$$M(An-1,An) \square M(Cn-1,Cn) \quad (2)$$

In other words, by using the motion information $M(A_{n-1}, A_n)$ of the original similar shot for the corresponding frame (for example, $C_{n-1}$) in the target similar shot, motion compensation prediction can be enabled in a similar manner.

$$Cn \square Cn-1*M(An-1,An) \quad (3)$$

When the motions of the original similar shot and the target similar shot are not identical but similar, the frame generated by the above expression (3) is assumed as similar to the frame $C_n$ in the target similar shot. Therefore, motion information M($A_n'$, $C_n$) obtained by motion compensation prediction between a reference frame $A_n'$ generated by the following expression (4) and the frame $C_n$ in the target similar shot is expected to have a small value, resulting in reduction of encoding volume.

$$An'□Cn-1*M(An-1,An) \quad (4)$$

The motion information M may be not only motion vector by block, but also global motion information expressing the motion of an overall screen, and both of the information may be used. The information required for the encoding includes a feedforward-prediction-use flag (a flag indicating whether the FF prediction is used), motion vector information, etc., and all information is described with respect to all blocks in the frame to be encoded. Furthermore, the reference frame when using the FF prediction is uniquely defined according to the reference frame upon the motion compensation for the original similar shot.

FIG. 43 is an explanatory diagram of an example of a configuration of an image processing device (encoder) according to method 3 of the selective inter-frame-motion-compensation prediction of example 3 of the present invention. The difference between the encoder shown in FIG. 43 and the encoder according to method 1 of example 3 shown in FIG. 34 is that an original-similar-shot-motion-information storing memory 4315 that stores the inter-frame motion information M of the original similar shot and an FF-motion compensating unit 4316 that performs motion compensation on an encoded frame using the motion information M of the original similar shot are added. The encoded frame and a frame subjected to the FF motion compensation are input to the selecting unit 4314. Therefore, functions of units other than above units, i.e., a transforming unit 4300, a quantizing unit 4301, an entropy-encoding unit 4302, an encoding control unit 4303, an inverse quantizing unit 4304, an inverse transforming unit 4305, a shot splitting unit 4307, a similar-shot detecting unit 4308, an inter-frame-motion detecting unit 4311, an inter-frame-motion compensating unit 4312, an encoded-shot storing memory 4313, and the selecting unit 4314 are identical to the functions of the like units shown in FIG. 34, thereby omitting explanation thereof.

FIG. 44 is a flowchart of an image encoding process performed by the image processing device (encoder) according to method 3 of the selective-inter-frame motion prediction of example 3 of the present invention. The difference between this process and the image encoding process according to method 1 of example 3 shown in FIG. 35 is that an FF-motion compensation-prediction process of the motion information M (step S4405) that is replaced with the process from steps S3505 to S3507 shown in FIG. 35 is added as the process when the difference similar shot is generated by referring to other similar shot without the in-shot encoding (step S4404: NO). Then the difference similar shot is generated by subtracting the correct-reference similar shot generated at step S4007 from the target similar shot (step S4408). Steps other than step S4405, i.e., steps S4401 to S4404, are identical to the like steps shown in FIG. 35, and steps S4406 to S4411 are identical to steps S3508 to S3513 shown in FIG. 35.

Next, decoding of an image encoded in the above manner will be explained. FIG. 45 is an explanatory diagram of an example of a configuration of the image processing device (decoder) according to method 3 of the selective-inter-frame motion prediction of example 3 of the present invention. The difference between this decoder and the decoder according to method 1 of example 3 shown in FIG. 36 is that an original-similar-shot-motion-information storing unit 4315 that stores the inter-frame motion information M of the original similar shot and an FF-motion compensating unit 4316 that performs motion compensation on an encoded frame using the original-similar-shot motion information M are added. Functions of units other than the original-similar-shot-motion-information storing memory 4315 and the FF-motion compensating unit 4316, i.e., an entropy-decoding unit 4500, an inverse quantizing unit 4501, an inverse transforming unit 4502, an inter-frame-motion compensating unit 4505, an encoded-shot storing memory 4506, and a reference-frame selecting unit 4507 are identical to the functions of the like units shown in FIG. 36.

Thus, according to an embodiment of the invention, a difference between the similar frames is encoded focusing on the similarity (redundancy of information) of plural shots constituting the image to be encoded, thereby reducing the data amount of the encoded stream. Furthermore, motion compensation is further performed between the similar frames. Therefore, displacement/deformation of an object in a frame can be corrected and the difference between the frames can be converged to a neighborhood of zero (i.e., the data amount of the encoded stream can be further reduced).

Furthermore, according to an embodiment of the invention a moving image encoded by another embodiment of the invention can be decoded.

The image processing method explained in the present embodiment can be achieved by implementing a previously prepared program in an arithmetic processing apparatus such as a processor or a microcomputer. Such a program is recorded in a recording medium readable by the arithmetic processing apparatus, such as a ROM, an HD, an FD, a CD-ROM, a CD-R, a CD-RW, an MO, or a DVD, and then, is read from the recording medium by the arithmetic processing apparatus, and executed. In addition, the program may be a transmission medium, which can be distributed via a network such as the Internet.

The invention claimed is:
1. An image processing apparatus comprising:
a shot splitting unit that splits a moving image into a plurality of shots each including a plurality of sequential frames;
a shot detecting unit that detects, among the shots, a second shot similar to a first shot that is to be encoded;
a first shot-generating unit that generates a third shot by correcting a time length of the second shot;
a second shot-generating unit that generates a fourth shot by performing motion compensation using at least one of the first shot and the third shot; and
an encoding unit that encodes a difference between the first shot and the fourth shot.
2. The image processing apparatus according to claim 1, further comprising:
a third shot-generating unit that generates a fifth shot by performing motion compensation using the fourth shot, wherein
the second shot-generating unit generates the fourth shot using difference information concerning frames in the first shot and the third shot,
and
the encoding unit encodes the difference between the first shot and the fifth shot.
3. The image processing apparatus according to claim 1, wherein
the second shot-generating unit generates the fourth shot by performing motion compensation on the first shot using motion information of the second shot.

4. An image processing apparatus comprising:
a shot decoding unit that decodes, among encoded data of a moving image, encoded data of a first shot that includes a plurality of sequential frames;
a first shot-generating unit that generates, using a method specified by shot generating information included in the encoded data of the moving image, a third shot by correcting a time length of a second shot that is in the moving image and similar to the first shot;
a second shot-generating unit that generates a fourth shot by performing motion compensation using at least one of the encoded data decoded by the shot decoding unit and the first shot; and
a shot adding unit that adds the encoded data decoded by the shot decoding unit to the fourth shot.

5. The image processing apparatus according to claim 4, comprising:
a third shot-generating unit that generates a fifth shot by performing motion compensation on the fourth shot, wherein
the second shot-generating unit generates the fourth shot using difference information concerning frames in the first shot and the third shot, and
the shot adding unit that adds the encoded data decoded by the shot decoding unit to the fifth shot.

6. The image processing apparatus according to claim 4, wherein
the second shot-generating unit generates the fourth shot by performing motion compensation on the first shot using motion information of the second shot.

7. An image processing method comprising:
using a processor to perform the steps of:
splitting a moving image into a plurality of shots each including a plurality of sequential frames;
detecting, among the shots, a second shot similar to a first shot that is to be encoded;
generating a third shot by correcting a time length of the second shot;
generating a fourth shot by performing motion compensation using at least one of the first shot and the third shot; and
encoding a difference between the first shot and the fourth shot.

8. The image processing method according to claim 7, further comprising:
using the processor to perform the steps of:
generating a fifth shot by performing motion compensation using the fourth shot, wherein
the generating the fourth shot includes generating the fourth shot using difference information concerning frames in the first shot and the third shot, and
the encoding includes encoding the difference between the first shot and the fifth shot.

9. The image processing method according to claim 7, wherein
the generating the fourth shot includes generating the fourth shot by performing motion compensation on the first shot using motion information of the second shot.

10. An image processing method comprising:
using a processor to perform the steps of:
decoding, among encoded data of a moving image, encoded data of a first shot that includes a plurality of sequential frames;
generating, using a method specified by shot generating information included in the encoded data of the moving image, a third shot by correcting a time length of a second shot that is in the moving image and similar to the first shot;
generating a fourth shot by performing motion compensation using at least one of the encoded data decoded at the decoding and the first shot; and
adding the encoded data decoded at the shot decoding to the fourth shot.

11. The image processing method according to claim 10, further comprising:
using the processor to perform the steps of:
generating a fifth shot by performing motion compensation on the fourth shot, wherein
the generating the fourth shot includes generating the fourth shot using difference information concerning frames in the first shot and the third shot, and
the adding includes adding the encoded data decoded at the decoding to the fifth shot.

12. The image processing method according to claim 10, wherein
the generating the fourth shot includes generating the fourth shot by performing motion compensation on the first shot using motion information of the second shot.

13. A non-transitory computer-readable recording medium storing therein a computer program that causes a computer to execute:
splitting a moving image into a plurality of shots each including a plurality of sequential frames;
detecting, among the shots, a second shot similar to a first shot that is to be encoded;
generating a third shot by correcting a time length of the second shot;
generating a fourth shot by performing motion compensation using at least one of the first shot and the third shot; and
encoding a difference between the first shot and the fourth shot.

14. The non-transitory computer-readable recording medium according to claim 13, wherein the computer program further causes a computer to execute:
generating a fifth shot by performing motion compensation using the fourth shot, wherein
the generating the fourth shot includes generating the fourth shot using difference information concerning frames in the first shot and the third shot, and
the encoding includes encoding the difference between the first shot and the fifth shot.

15. The non-transitory computer-readable recording medium according to claim 13, wherein
the generating the fourth shot includes generating the fourth shot by performing motion compensation on the first shot using motion information of the second shot.

16. A non-transitory computer-readable recording medium storing therein a computer program that causes a computer to execute:
decoding, among encoded data of a moving image, encoded data of a first shot that includes a plurality of sequential frames;
generating, using a method specified by shot generating information included in the encoded data of the moving image, a third shot by correcting a time length of a second shot that is in the moving image and similar to the first shot;
generating a fourth shot by performing motion compensation using at least one of the encoded data decoded at the decoding and the first shot; and adding the encoded data decoded at the shot decoding to the fourth shot.

17. The non-transitory computer-readable recording medium according to claim 16, wherein the computer program further causes the computer to execute:
generating a fifth shot by performing motion compensation on the fourth shot, wherein
the generating the fourth shot includes generating the fourth shot using difference information concerning frames in the first shot and the third shot, and
the adding includes adding the encoded data decoded at the decoding to the fifth shot.

18. The non-transitory computer-readable recording medium according to claim 16, wherein
the generating the fourth shot includes generating the fourth shot by performing motion compensation on the first shot using motion information of the second shot.

* * * * *